(12) United States Patent
Miller et al.

(10) Patent No.: US 12,321,741 B2
(45) Date of Patent: Jun. 3, 2025

(54) TECHNIQUES FOR BUILDING DATA CENTERS IN CLOUD REGIONS WITH VERSION SETS

(71) Applicant: Oracle International Corporation, Redwood Shores, CA (US)

(72) Inventors: Erik Joseph Miller, Seattle, WA (US); Caleb Dockter, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 110 days.

(21) Appl. No.: 18/076,267

(22) Filed: Dec. 6, 2022

(65) Prior Publication Data

US 2023/0251852 A1 Aug. 10, 2023

Related U.S. Application Data

(60) Provisional application No. 63/315,014, filed on Feb. 28, 2022, provisional application No. 63/312,814, filed on Feb. 22, 2022, provisional application No. 63/308,003, filed on Feb. 8, 2022.

(51) Int. Cl.
 *G06F 9/44* (2018.01)
 *G06F 8/60* (2018.01)
 *G06F 8/71* (2018.01)

(52) U.S. Cl.
 CPC . *G06F 8/71* (2013.01); *G06F 8/60* (2013.01)

(58) Field of Classification Search
 CPC ..................................... G06F 8/71; G06F 8/60
 See application file for complete search history.

(56) References Cited

U.S. PATENT DOCUMENTS

| | | | |
|---|---|---|---|
| 11,425,054 B1* | 8/2022 | Dunsmore | ............ H04L 47/828 |
| 11,671,325 B1* | 6/2023 | Kuo | .................... H04L 41/0873 |
| | | | 709/220 |
| 2017/0228227 A1 | 8/2017 | Winterfeldt et al. | |
| 2021/0224076 A1 | 7/2021 | Dockter et al. | |
| 2021/0224122 A1 | 7/2021 | Glass et al. | |
| 2021/0224134 A1 | 7/2021 | Glass | |
| 2021/0405985 A1* | 12/2021 | Shteyman | ................. G06F 8/71 |

(Continued)

OTHER PUBLICATIONS

Papazoglou et al., Service Oriented Architectures: Approaches, Technologies and Research Issues, The VLDB Journal, vol. 16, No. 3, Jul. 1, 2007, pp. 389-415.

(Continued)

*Primary Examiner* — Hang Pan
(74) *Attorney, Agent, or Firm* — Kilpatrick Townsend & Stockton LLP

(57) ABSTRACT

Techniques are described for performing an automated region build using a version set that identifies versions of configuration files and/or artifacts with which the region build is to be performed. A Multi-Flock Orchestrator (MFO) may be configured to maintain multiple version sets identifying a respective set of configuration files associated with various services to be bootstrapped. The MFO may execute a validation process using one version set. A second version set may be identified from the first based on identifying configuration files that successfully passed the validation process. The automated region build can be performed using the second version set.

17 Claims, 14 Drawing Sheets

(56) References Cited

U.S. PATENT DOCUMENTS

2022/0121455 A1* 4/2022 Hoban ............... H04L 41/5054

OTHER PUBLICATIONS

International Application No. PCT/US2022/053397, International Search Report and the Written Opinion mailed on Mar. 22, 2023, 9 pages.

International Application No. PCTUS2022053399, International Search Report and Written Opinion mailed on Mar. 17, 2023, 12 pages.

International Application No. PCT/US2023/012035, "International Search Report and Written Opinion", dated May 9, 2023, 11 pages.

International Application No. PCT/US2023/012212, "International Search Report and Written Opinion", dated May 2, 2023, 12 pages.

International Application No. PCT/US2022/053397, International Preliminary Report on Patentability mailed on Aug. 22, 2024, 7 pages.

International Application No. PCT/US2022/053399, International Preliminary Report on Patentability mailed on Aug. 22, 2024, 9 pages.

* cited by examiner

TECHNIQUES FOR BUILDING DATA CENTERS IN CLOUD REGIONS WITH VERSION SETS

CROSS-REFERENCE TO RELATED APPLICATIONS

This non-provisional application claims priority to U.S. Provisional Patent Application No. 63/308,003, filed on Feb. 8, 2022, entitled "Techniques for Bootstrapping a Region Build," U.S. Provisional Patent Application No. 63/312,814, filed on Feb. 22, 2022, entitled "Techniques for Implementing Virtual Data Centers," and U.S. Provisional Patent Application No. 63/315,014, filed on Feb. 28, 2022, entitled "Techniques for Building Data Centers in Cloud Regions with Version Sets," the disclosures of which are herein incorporated by reference in their entirety for all purposes.

BACKGROUND

Today, cloud infrastructure services utilize many individual services to build a data center (e.g., to bootstrap various resources in a data center of a particular geographic region). In some examples, a region is a logical abstraction corresponding to a localized geographical area in which one or more data centers are (or are to be) located. Building a data center may include provisioning and configuring infrastructure resources and deploying code to those resources (e.g., for a variety of services). The operations for building a data center may be collectively referred to as performing a "region build." Any suitable number of data centers may be included in a region and therefore a region build may include operations for building multiple data centers. Conventional tools for building a region require significant manual effort. Additionally, bootstrapping operations for one service may depend on other functionality and/or services of the region which may not yet be available. As the number of service teams and regions grows, the tasks performed for orchestrating provisioning and deployment drastically increase. Substantially relying on manual efforts for bootstrapping services and/or building regions is time intensive, incurs risks, and may not scale well.

BRIEF SUMMARY

Embodiments of the present disclosure relate to performing an automated region build (e.g., bootstrapping (e.g., provisioning and/or deploying) resources (e.g., infrastructure component, artifacts, etc.) for any suitable number of services within a region (e.g., a geographical location associated with one or more data centers)). Bootstrapping operations can be coordinated and orchestrated by an orchestration service (e.g., a Multi-Flock Orchestrator) based at least in part on automatic detection of dependencies between these operations. The Multi-Flock Orchestrator may further maintain various versions of configuration files and/or software artifacts and can intelligently and automatically identify a particular version set with which a region build is to be performed.

At least one embodiment is directed to a computer-implemented method. The method may include obtaining, by a Multi-Flock Orchestrator of a cloud-computing environment, a plurality of configuration files corresponding to a plurality of services to be bootstrapped within a region corresponding to one or more data centers. In some embodiments, each of the plurality of services are associated with a respective set of resources comprising an infrastructure component and a corresponding software artifact. The method may further include identifying, by the Multi-Flock Orchestrator, one or more dependencies between the plurality of services based at least in part on the plurality of configuration files. The method may further include determining, by the Multi-Flock Orchestrator, an order by which operations for bootstrapping the plurality of services are to be executed based at least in part on the one or more dependencies identified. The method may further include incrementally instructing, by the Multi-Flock Orchestrator, a bootstrap controller to perform corresponding operations for bootstrapping the plurality of services in accordance with determined order.

Another embodiment is directed to another computer-implemented method. The method may include maintaining, by a Multi-Flock Orchestrator of a cloud-computing environment, a plurality of version sets identifying a respective set of configuration files of a plurality of configuration files associated with a plurality of services. The method may further include determining, by the Multi-Flock Orchestrator, a first version set identifying a first set of configuration files from the plurality of configuration files. The method may further include executing, by the Multi-Flock Orchestrator, a validation process for validating the first set of configuration files identified by the first version set. The method may further include generating, by the Multi-Flock Orchestrator, a second version set identifying a second set of flock configuration files. In some embodiments, the second set of configuration files may be identified from the first set of configuration files based at least in part on identifying configuration files that successfully passed the validation process. The method may further include executing, by the Multi-Flock Orchestrator, a region build utilizing the second set of configuration files identified by the second version set.

Another embodiment is directed to a computing device comprising one or more processors and instructions that, when executed by the one or more processors, cause the computing device to perform the method(s) disclosed herein.

Still another embodiment is directed to a non-transitory computer-readable medium storing computer-executable instructions that, when executed by one or more processors of a computing cluster, cause the computing cluster to perform the method(s) disclosed herein.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
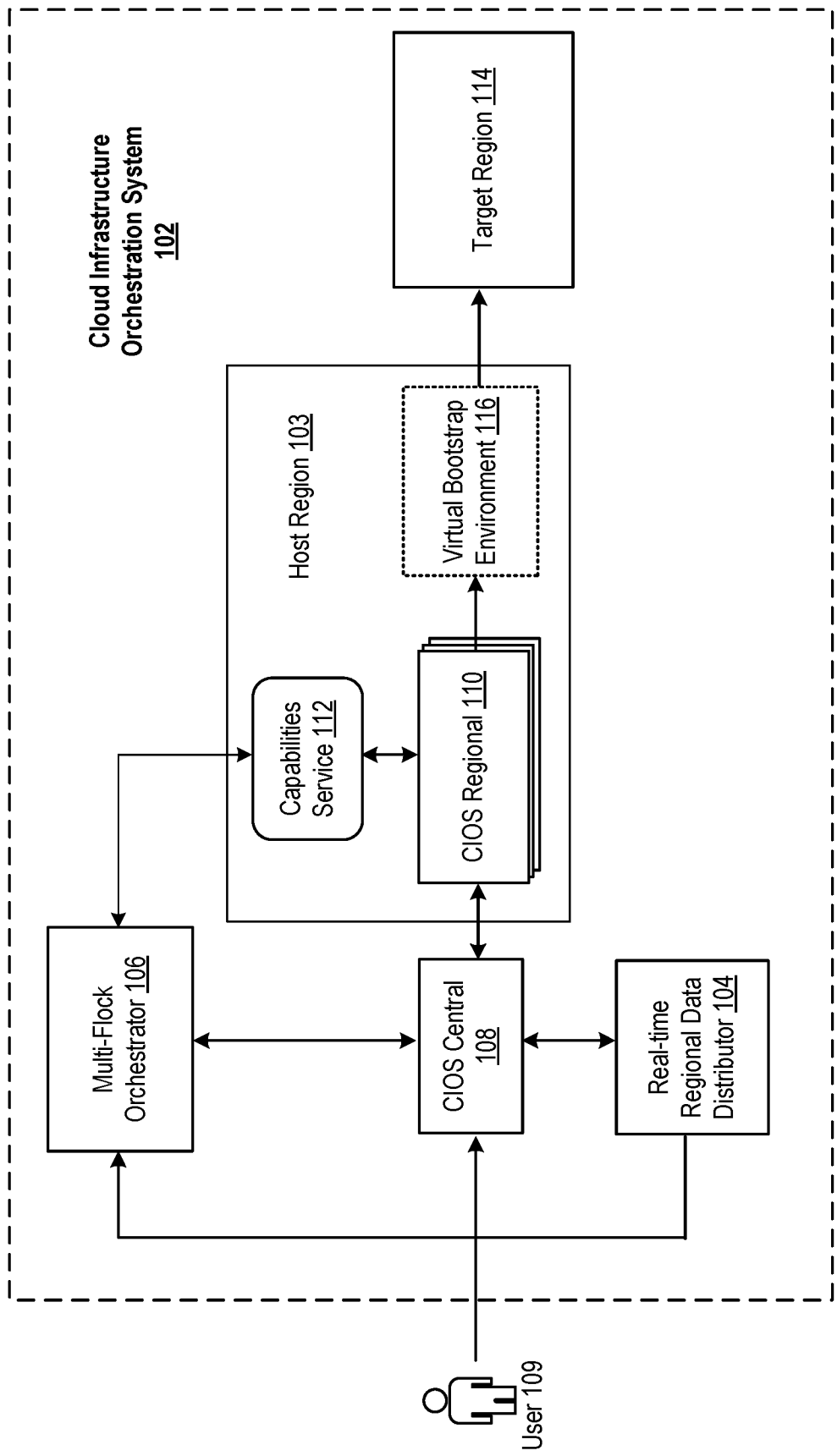
FIG. 1 is a block diagram of an environment in which a Cloud Infrastructure Orchestration Service (CIOS) may operate to dynamically provide bootstrap services in a region, according to at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Example Automated Data Center Build (Region Build) Infrastructure

The adoption of cloud services has seen a rapid uptick in recent times. Various types of cloud services are now provided by various cloud service providers (CSPs). The term cloud service is generally used to refer to a service or functionality that is made available by a CSP to users or customers on demand (e.g., via a subscription model) using systems and infrastructure (cloud infrastructure) provided by the CSP. Typically, the servers and systems that make up the CSP's infrastructure and which is used to provide a cloud service to a customer are separate from the customer's own on-premise servers and systems. Customers can thus avail themselves of cloud services provided by the CSP without having to purchase separate hardware and software resources for the services. Cloud services are designed to provide a subscribing customer easy, scalable, and on-demand access to applications and computing resources without the customer having to invest in procuring the infrastructure that is used for providing the services or functions. Various different types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, and the like.

As indicated above, a CSP is responsible for providing the infrastructure and resources that are used for providing cloud services to subscribing customers. The resources provided by the CSP can include both hardware and software resources. These resources can include, for example, compute resources (e.g., virtual machines, containers, applications, processors), memory resources (e.g., databases, data stores), networking resources (e.g., routers, host machines, load balancers), identity, and other resources. In certain implementations, the resources provided by a CSP for providing a set of cloud services CSP are organized into data centers. A data center may be configured to provide a particular set of cloud services. The CSP is responsible for equipping the data center with infrastructure and resources that are used to provide that particular set of cloud services. A CSP may build one or more data centers.

Data centers provided by a CSP may be hosted in different regions. A region is a localized geographic area and may be identified by a region name. Regions are generally independent of each other and can be separated by vast distances, such as across countries or even continents. Regions are grouped into realms. Examples of regions for a CSP may include US West, US East, Australia East, Australia Southeast, and the like.

A region can include one or more data centers, where the data centers are located within a certain geographic area corresponding to the region. As an example, the data centers in a region may be located in a city within that region. For example, for a particular CSP, data centers in the US West region may be located in San Jose, California; data centers in the US East region may be located in Ashburn, Virginia; data centers in the Australia East region may be located in Sydney, Australia; data centers in the Australia Southeast region may be located in Melbourne, Australia; and the like.

Data centers within a region may be organized into one or more availability domains, which are used for high availability and disaster recovery purposes. An availability domain can include one or more data centers within a region. Availability domains within a region are isolated from each other, fault tolerant, and are architected in such a way that data centers in multiple availability domains are very unlikely to fail simultaneously. For example, the availability domains within a region may be structured in a manner such that a failure at one availability domain within the region is unlikely to impact the availability of data centers in other availability domains within the same region.

When a customer or subscriber subscribes to or signs up for one or more services provided by a CSP, the CSP creates a tenancy for the customer. The tenancy is like an account that is created for the customer. In certain implementations, a tenancy for a customer exists in a single realm and can access all regions that belong to that realm. The customer's users can then access the services subscribed to by the customer under this tenancy.

As indicated above, a CSP builds or deploys data centers to provide cloud services to its customers. As a CSP's customer base grows, the CSP typically builds new data centers in new regions or increases the capacity of existing data centers to service the customers' growing demands and to better serve the customers. Preferably, a data center is built in close geographical proximity to the location of customers serviced by that data center. Geographical proximity between a data center and customers serviced by that data center lends to more efficient use of resources and faster and more reliable services being provided to the customers. Accordingly, a CSP typically builds new data centers in new regions in geographical areas that are geographically proximal to the customers serviced by the data centers. For example, for a growing customer base in Germany, a CSP may build one or more data centers in a new region in Germany.

Building a data center (or multiple data centers) in a region is sometimes also referred to as building a region. The term "region build" is used to refer to building one or more data centers in a region. Building a data center in a region involves provisioning or creating a set of new resources that are needed or used for providing a set of services that the data center is configured to provide. The end result of the region build process is the creation of a data center in a region, where the data center is capable of providing a set of services intended for that data enter and includes a set of resources that are used to provide the set of services.

Building a new data center in a region is a very complex activity requiring coordination between various teams. At a high level, this involves the performance and coordination of various tasks such as: identifying the set of services to be provided by the data center, identifying various resources that are needed for providing the set of services, creating, provisioning, and deploying the identified resources, wiring the resources properly so that they can be used in an intended manner, and the like. Each of these tasks further have subtasks that need to be coordinated, further adding to the complexity. Due to this complexity, presently, the building of a data center in a region involves several manually-initiated or manually-controlled tasks that require careful manual coordination. As a result, the task of building a new region (i.e., building one or more data centers in a region) is very time consuming. It can take time, for example, many months to build a data center. Additionally, the process is very error prone, sometimes requiring several iterations before a desired configuration of the data center is achieved, which further adds to the time taken to build a data center. These limitations and problems severely limit a CSP's ability to grow in a timely manner responsive to increasing customer needs.

The present disclosure describes techniques for reducing the time and manual efforts needed for building one or more data centers in a region. This is made possible by automating several of the tasks that are involved in building a region. The automation significantly reduces the time needed to build a data center in a region and reduces the manual coordination that is needed. Instead of weeks and months needed to build a data center in a region in the past, the techniques described herein can be used to build a new data center in a region in a relatively much shorter time.

A Cloud Infrastructure Orchestration Service (CIOS) is disclosed herein that is configured to bootstrap (e.g., provision and deploy) services into a new data center based on predefined configuration files that identify the resources (e.g., infrastructure components and software to be deployed) for implementing a given change to the data center. The CIOS can identify dependencies between bootstrapping tasks using a static analysis of these configuration files. CIOS can use these dependencies to coordinate the order in which various changes are made to the new data center (e.g., the order by which services are bootstrapped in the region). The CIOS can detect various capabilities of the region as they become available which enables the system to identify and implement additional changes that can now be made to the region. Utilizing the techniques disclosed herein, the CIOS may optimize parallel processing to execute changes to the new data center while ensuring that tasks are not initiated until the functionality on which those tasks depend is available in the region. In this manner, the CIOS enables a region build to be performed as a substantially automated process, which greatly reduces the risk of error and time required in conventional systems.

A Multi-Flock Orchestrator (MFO) is disclosed herein. MFO may be configured to utilize a number of version sets that identify differing sets of configuration files to be utilized for testing and/or a region build (e.g., provisioning and/or deploying to data centers of a region). A particular version set can be used for building data center(s) of a region. That version set can identify a particular set of configuration files from which bootstrapping tasks (e.g., provisioning and deployment tasks) in the region may be determined. MFO may perform a static analysis of the configuration files to identify dependencies between services and to identify and resolve circular dependencies prior to region build. MFO may incrementally instruct a provisioning and deployment manager (e.g., CIOS Central, discussed in FIGS. 1-3) to perform bootstrapping tasks, while ensuring that dependent bootstrapping tasks are not initiated until the resource on which those tasks depend is available. As various capabilities of the region become available, MFO may identify and implement subsequent bootstrapping tasks to be performed, incrementally driving the build process to completion. The disclosed techniques allow for unit and/or integration tests to be performed with configuration files prior to those files being utilized for a region build, which increases the likelihood of a successful region build. Using the disclosed techniques, MFO enables an automated region build to be performed while reducing the risk of error and time required in conventional systems.

Certain Definitions

A "region" is a logical abstraction corresponding to a geographical location. A region can include any suitable number of one or more execution targets. In some embodiments, an execution target could correspond to a data center.

An "execution target" refers to a smallest unit of change for executing a release. A "release" refers to a representation of an intent to orchestrate a specific change to a service (e.g., deploy version 8, "add an internal DNS record," etc.). For most services, an execution target represents is an "instance" of a service. A single service can be bootstrapped to each of one or more execution targets. An execution target may be associated with a set of devices (e.g., a data center).

"Bootstrapping" is intended to refer to the collective tasks associated with provisioning and deployment of any suitable number of resources (e.g., infrastructure components, artifacts, etc.) corresponding to a single service.

A "service" refers to functionality provided by a set of resources. A set of resources for a service includes any suitable combination of infrastructure, platform, or software (e.g., an application) hosted by a cloud provider that can be configured to provide the functionality of a service. A service can be made available to users through the Internet.

An "artifact" refers to code being deployed to an infrastructure component or a Kubernetes engine cluster, this may include software (e.g., an application), configuration information (e.g., a configuration file) for an infrastructure component, or the like.

A "flock config" refers to a configuration file (or a set of configuration files) that describes a set of all resources (e.g., infrastructure components and artifacts) associated with a single service. A flock config may include declarative statements that specify one or more aspects corresponding to a desired state of the resources of the service.

"Service state" refers to a point-in-time snapshot of every resource (e.g., infrastructure resources, artifacts, etc.) associated with the service. The service state indicates status corresponding to provisioning and/or deployment tasks associated with service resources.

IaaS provisioning (or "provisioning") refers to acquiring computers or virtual hosts for use, and even installing needed libraries or services on them. The phrase "provisioning a device" refers to evolving a device to a state in which it can be utilized by an end-user for their specific use. A device that has undergone the provisioning process may be referred to as a "provisioned device." Preparing the provisioned device (installing libraries and daemons) may be part of provisioning; this preparation is different from deploying new applications or new versions of an application onto the prepared device. In most cases, deployment does not include provisioning, and the provisioning may need to be performed first. Once prepared, the device may be referred to as "an infrastructure component."

IaaS deployment (or "deployment") refers to the process of providing and/or installing a new application, or a new version of an application, onto a provisioned infrastructure component. Once the infrastructure component has been provisioned (e.g., acquired, assigned, prepared, etc.), additional software may be deployed (e.g., provided to and installed on the infrastructure component). The infrastructure component can be referred to as a "resource" after provisioning and deployment has concluded. Examples of resources may include, but are not limited to, virtual machines, databases, object storage, block storage, load balancers, and the like.

A "capability" identifies a unit of functionality associated with a service. The unit could be a portion, or all, of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use.

A "virtual bootstrap environment" (ViBE) refers to a virtual cloud network that is provisioned in the overlay of an existing region (e.g., a "host region"). Once provisioned, a ViBE is connected to a new region using a communication channel (e.g., an IPSec Tunnel VPN). Certain essential core services (or "seed" services) like a deployment orchestrator, a public key infrastructure (PKI) service, and the like can be provisioned in a ViBE. These services can provide the capabilities required to bring the hardware online, establish a chain of trust to the new region, and deploy the remaining services in the new region. Utilizing the virtual bootstrap environment can prevent circular dependencies between bootstrapping resources by utilizing resources of the host region. Services can be staged and texted in the ViBE prior to the physical region (e.g., the target region) being available.

A "Cloud Infrastructure Orchestration Service" (CIOS) may refer to a system configured to manage provisioning and deployment operations for any suitable number of services as part of a region build.

A Multi-Flock Orchestrator (MFO) may be a computing component (e.g., a service) configured that coordinates events between components of the CIOS to automatically provision and deploy services to a target region (e.g., a new region). An MFO tracks relevant events for each service of the region build and takes actions in response to those events.

A "host region" refers to a region that hosts a virtual bootstrap environment (ViBE). A host region may be used to bootstrap a ViBE.

A "target region" refers to a region under build.

"Publishing a capability" refers to "publishing" as used in a "publisher-subscriber" computing design or otherwise providing an indication that a particular capability is available (or unavailable). The capabilities are "published" (e.g., collected by a capabilities service, provided to a capabilities service, pushed, pulled, etc.) to provide an indication that functionality of a resource/service is available. In some embodiments, capabilities may be published/transmitted via an event, a notification, a data transmission, a function call, an API call, or the like. An event (or other notification/data transmission/etc.) indicating availability of a particular capability can be broadcasted/addressed (e.g., published) to a capabilities service.

A "Capabilities Service" may be a flock configured to model dependencies between different flocks. A capabilities service may be provided within a Cloud Infrastructure Orchestration Service and may define what capabilities, services, features have been made available in a region.

A "Real-time Regional Data Distributor" (RRDD) can be a service or system configured to manage region data. This region data can be injected into flock configs to dynamically create execution targets for new regions.

In some examples, techniques for implementing a Cloud Infrastructure Orchestration Service (CIOS) are described herein. Such techniques, as described briefly above, can be configured to manage bootstrapping (e.g., provisioning and deploying software to) infrastructure components within a cloud environment (e.g., a region). In some instances, the CIOS can include computing components (e.g., a CIOS Central and a CIOS Regional, both of which will be described in further detail below) that may be configured to manage bootstrapping tasks (provisioning and deployment) for a given service and a Multi-Flock Orchestrator (also described in further detail below) configured to initiate/manage region builds (e.g., bootstrapping operations corresponding to multiple services).

CIOS enables region building and world-wide infrastructure provisioning and code deployment with minimal manual run-time effort from service teams (e.g., beyond an initial approval and/or physical transportation of hardware, in some instances). The high-level responsibilities of CIOS include, but are not limited to, coordinating region builds in an automated fashion with minimal human intervention, providing users with a view of the current state of resources managed by the CIOS (e.g., of a region, across regions, world-wide, etc.), and managing bootstrapping operations for bootstrapping resources within a region.

The CIOS may provide view reconciliation, where a view of a desired state (e.g., a desired configuration) of resources may be reconciled with a current/actual state (e.g., a current configuration) of the resources. In some instances, view reconciliation may include obtaining state data to identify what resources are actually running and their current configuration and/or state. Reconciliation can be performed at a variety of granularities, such as at a service level.

CIOS can perform plan generation, where differences between the desired and current state of the resources are identified. Part of plan generation can include identifying the operations that would need to be executed to bring the resources from the current state to the desired state. Once the user is satisfied with a plan, the plan can then be marked as approved or rejected. Thus, users can spend less time reasoning about the plan and the plans are more accurate because they are machine generated. Plans are almost too detailed for human consumption; however, CIOS can provide this data via a sophisticated user interface (UI).

In some examples, CIOS can handle execution of change management by automatically executing the approved plan. Once an execution plan has been created and approved, engineers may no longer need to participate in change management unless CIOS initiates roll-back. CIOS can handle rolling back to a previous service version by automatically generating a plan that returns the service to a previous (e.g., pre-release) state (e.g., when CIOS detects service health degradation while executing).

CIOS can measure service health by monitoring alarms and executing integration tests. CIOS can help teams quickly define roll-back behavior in the event of service degradation, which it can later execute automatically. CIOS can automatically generate and display plans and can track approval. CIOS can combine the functionality of provisioning and deployment in a single system that coordinates these tasks across a region build. CIOS also supports automated discovery of flocks (e.g., service resources such as flock config(s) corresponding to any suitable number of services), artifacts, resources, and dependencies. CIOS can discover dependencies between execution tasks at every level (e.g., resource level, execution target level, phase level, service level, etc.) through a static analysis (e.g., including parsing and processing content) of one or more configuration files. Using these dependencies, CIOS can generate various data structures from these dependencies that can be used to drive task execution (e.g., tasks regarding provisioning of infrastructure resources and deployment of artifacts across the region).

FIG. 1 is a block diagram of an environment 100 in which a Cloud Infrastructure Orchestration Service (CIOS) 102 may operate to dynamically provide bootstrap services in a region, according to at least one embodiment. CIOS 102 can include, but is not limited to, the following components: Real-time Regional Data Distributor (RRDD) 104, Multi-Flock Orchestrator (MFO) 106, CIOS Central 108, CIOS Regional 110, and Capabilities Service 112. Specific functionality of CIOS Central 108 and CIOS Regional 110 is provided in more detail in U.S. application Ser. No. 17/016, 754, entitled "Techniques for Deploying Infrastructure Resources with a Declarative Provisioning Tool," the entire contents of which are incorporated in its entirety for all purposes. In some embodiments, any suitable combination of the components of CIOS 102 may be provided as a service. In some embodiments, some portion of CIOS 102 may be deployed to a region (e.g., a data center represented by host region 103). In some embodiments, CIOS 102 may include any suitable number of cloud services (not depicted in FIG. 1) discussed in further detail in U.S. application Ser. No. 17/016,754 and below with respect to FIGS. 2 and 3.

Real-time Regional Data Distributor (RRDD) 104 may be configured to maintain and provide region data that identifies realms, regions, execution targets, and availability domains. In some cases, the region data may be in any suitable form (e.g., JSON format, data objects/containers, XML, etc.). Region data maintained by RRDD 104 may include any suitable number of subsets of data which can individually be referenceable by a corresponding identifier. By way of example, an identifier "all_regions" can be associated with a data structure (e.g., a list, a structure, an object, etc.) that includes a metadata for all defined regions. As another example, an identifier such as "realms" can be associated with a data structure that identifies metadata for a number of realms and a set of regions corresponding to each realm. In general, the region data may maintain any suitable attribute of one or more realm(s), region(s), availability domains (ADs), execution target(s) (ETs), and the like, such as identifiers, DNS suffixes, states (e.g., a state of a region), and the like. The RRDD 104 may be configured to manage region state as part of the region data. A region state may include any suitable information indicating a state of bootstrapping within a region. By way of example, some example region states can include "initial," "building," "production," "paused," or "deprecated." The "initial" state may indicate a region that has not yet been bootstrapped. A "building" state may indicate that bootstrapping of one or more flocks within the region has commenced. A "production" state may indicate that bootstrapping has been completed and the region is ready for validation. A "paused" state may indicate that CIOS Central 108 or CIOS Regional 110 has paused internal interactions with the regional stack, likely due to an operational issue. A "deprecated" state may indicate the region has been deprecated and is likely unavailable and/or will not be contacted again.

CIOS Central 108 is configured to provide any suitable number of user interfaces with which users (e.g., user 109) may interact with CIOS 102. By way of example, users can make changes to region data via a user interface provided by CIOS Central 108. CIOS Central 108 may additionally provide a variety of interfaces that enable users to: view changes made to flock configs and/or artifacts, generate and view plans, approve/reject plans, view status on plan execution (e.g., corresponding to tasks involving infrastructure provisioning, deployment, region build, and/or desired state of any suitable number of resources managed by CIOS 102. CIOS Central 108 may implement a control plane configured to manage any suitable number of CIOS Regional 110 instances. CIOS Central 108 can provide one or more user interfaces for presenting region data, enabling the user 109 to view and/or change region data. CIOS Central 108 can be configured to invoke the functionality of RRDD 104 via any suitable number of interfaces. Generally, CIOS Central 108 (also referred to as a "provisioning and deployment manager") may be configured to manage region data, either directly or indirectly (e.g., via RRDD 104). CIOS Central 108 may be configured to compile flock configs to inject region data as variables within the flock configs.

Each instance of CIOS Regional 110 may correspond to a module configured to execute bootstrapping tasks that are associated with a single service of a region. CIOS Regional 110 can receive desired state data from CIOS Central 108. In some embodiments, desired state data may include a flock config that declares (e.g., via declarative statements) a desired state of resources associated with a service. CIOS Central 108 can maintain current state data indicating any suitable aspect of the current state of the resources associated with a service. In some embodiments, CIOS Regional 110 can identify, through a comparison of the desired state data and the current state data, that changes are needed to one or more resources. For example, CIOS Regional 110 can determine that one or more infrastructure components need to be provisioned, one or more artifacts deployed, or any suitable change needed to the resources of the service to bring the state of those resources in line with the desired state. As CIOS Regional 110 performs bootstrapping operations, it may publish data indicating various capabilities of a resource as they become available. A "capability" identifies a unit of functionality associated with a service. The unit could be a portion, or all of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use.

Capabilities Service 112 is configured to maintain capabilities data that indicates 1) what capabilities of various services are currently available, 2) whether any resource/service is waiting on a particular capability, 3) what particular resources and/or services are waiting on a given capability, or any suitable combination of the above. Capabilities Service 112 may provide an interface with which capabilities data may be requested. Capabilities Service 112 may provide one or more interfaces (e.g., application programming interfaces) that enable it to transmit capabilities data to MFO 106 and/or CIOS Regional 110 (e.g., each instance of CIOS Regional 110). In some embodiments, MFO 106 and/or any suitable component or module of CIOS Regional 110 may be configured to request capabilities data from Capabilities Service 112.

In some embodiments, Multi-Flock Orchestrator (MFO) 106 may be configured to drive region build efforts. In some embodiments, MFO 106 can manage information that describes what flock/flock config versions and/or artifact versions are to be utilized to bootstrap a given service within a region (or to make a unit of change to a target region). In some embodiments, MFO 106 may be configured to monitor (or be otherwise notified of) changes to the region data managed by Real-time Regional Data Distributor 104. In some embodiments, receiving an indication that region data has been changed may cause a region build to be triggered by MFO 106. In some embodiments, MFO 106 may collect various flock configs and artifacts to be used for a region build. Some, or all, of the flock configs may be configured to be region agnostic. That is, the flock configs may not explicitly identify what regions to which the flock is to be bootstrapped. In some embodiments, MFO 106 may trigger a data injection process through which the collected flock configs are recompiled (e.g., by CIOS Central 108). During recompilation, operations may be executed (e.g., by CIOS Central 108) to cause the region data maintained by Real-time Regional Data Distributor 104 to be injected into the config files. Flock configs can reference region data through variables/parameters without requiring hard-coded identification of region data. The flock configs can be dynamically modified at run time using this data injection rather than having the region data be hardcoded, and therefore, and more difficult to change.

Multi-Flock Orchestrator 106 can perform a static flock analysis in which the flock configs are parsed to identify dependencies between resources, execution targets, phases, and flocks, and in particular to identify circular dependencies that need to be removed. In some embodiments, MFO 106 can generate any suitable number of data structures based on the dependencies identified. These data structures (e.g., directed acyclic graph(s), linked lists, etc.) may be utilized by the Cloud Infrastructure Orchestration Service 102 to drive operations for performing a region build. By way of example, these data structures may collectively define an order by which services are bootstrapped within a region. An example of such a data structure is discussed further below with respect to Build Dependency Graph 338 of FIG. 3. If circular dependencies (e.g., service A requires service B and vice versa) exist and are identified through the static flock analysis and/or graph, MFO may be configured to notify any suitable service teams that changes are required to the corresponding flock config to correct these circular dependencies. MFO 106 can be configured to traverse one or more data structures to manage an order by which services are bootstrapped to a region. MFO 106 can identify (e.g., using data obtained from Capabilities Service 112) capabilities available within a given region at any given time. MFO 106 can this data to identify when it can bootstrap a service, when bootstrapping is blocked, and/or when bootstrapping operations associated with a previously blocked service can resume. Based on this traversal, MFO 106 can perform a variety of releases in which instructions are transmitted by MFO 106 to CIOS Central 108 to perform bootstrapping operations corresponding to any suitable number of flock configs. In some examples, MFO 106 may be configured to identify that one or more flock configs may require multiple releases due to circular dependencies found within the graph. As a result, MFO 106 may transmit multiple instruction sets to CIOS Central 108 for a given flock config to break the circular dependencies identified in the graph.

In some embodiments, a user can request that a new region (e.g., target region 114) be built. This can involve bootstrapping resources corresponding to a variety of services. In some embodiments, target region 114 may not be communicatively available (and/or secure) at a time at which the region build request is initiated. Rather than delay bootstrapping until such time as target region 114 is available and configured to perform bootstrapping operations, CIOS 102 may initiate the region build using a virtual bootstrap environment 116. Virtual bootstrap environment (ViBE) 116 may be an overlay network that is hosted by host region 103 (a preexisting region that has previously been configured with a core set of services and which is communicatively available and secure). MFO 106 can leverage resources of the host region 103 to bootstrap resources to the ViBE 116 (generally referred to as "building the ViBE"). By way of example, MFO 106 can provide instructions through CIOS Central 108 that cause an instance of CIOS Regional 110 within a host region (e.g., host region 103) to bootstrap another instance of CIOS Regional within the ViBE 116. Once the CIOS Regional within the ViBE is available for processing, bootstrapping the services for the target region 114 can continue within the ViBE 116. When target region 114 is available to perform bootstrapping operations, the previously bootstrapped services within ViBE 116 may be migrated to target region 114. Utilizing these techniques, CIOS 102 can greatly improve the speed at which a region is built by drastically reducing the need for any manual input and/or configuration to be provided.

Figure 2:
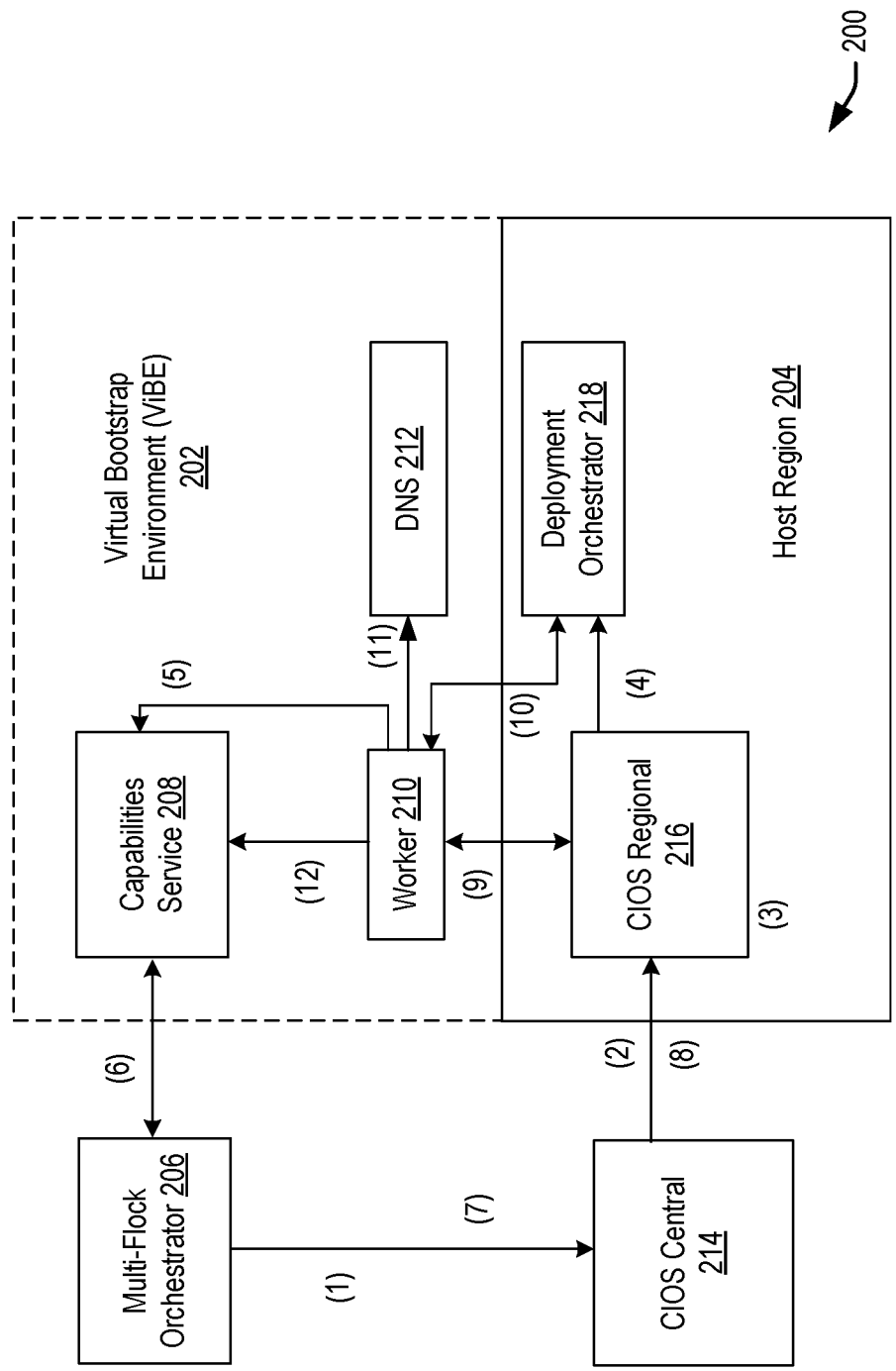
FIG. 2 is a block diagram for illustrating an environment and method for building a virtual bootstrap environment (ViBE), according to at least one embodiment.

FIG. 2 is a block diagram for illustrating an environment 200 and method for building a virtual bootstrap environment (ViBE) 202 (an example of ViBE 116 of FIG. 1), according to at least one embodiment. ViBE 202 represents a virtual cloud network that is provisioned in the overlay of an existing region (e.g., host region 204, an example of the host region 103 of FIG. 1 and in an embodiment is a Host Region Service Enclave). ViBE 202 represents an environment in which services can be staged for a target region (e.g., a region under build such as target region 114 of FIG. 1) before the target region becomes available.

In order to bootstrap a new region (e.g., target region 114 of FIG. 1), a cores set of services may be bootstrapped.

While those core set of services exist in the host region 204, they do not yet exist in the ViBE (nor the target region). These essential core services provide the functionality needed to provision devices, establish a chain of trust to the new region, and deploy remaining services (e.g., flocks) into a region. The ViBE 202 may be a tenancy that is deployed in a host region 204. It can be thought of as a virtual region.

When the target region is available to provide bootstrapping operations, the ViBE 202 can be connected to the target region so that services in the ViBE can interact with the services and/or infrastructure components of the target region. This will enable deployment of production level services, instead of self-contained seed services as in previous systems, and will require connectivity over the internet to the target region. Conventionally, a seed service was deployed as part of a container collection and used to bootstrap dependencies necessary to build out the region. Using infrastructure/tooling of an existing region, resources may be bootstrapped (e.g., provisioned and deployed) into the ViBE 202 and connected to the service enclave of a region (e.g., host region 204) in order to provision hardware and deploy services until the target region is self-sufficient and can be communicated with directly. Utilizing the ViBE 202 allows for standing up the dependencies and services needed to be able to provision/prepare infrastructure and deploy software while making use of the host region's resources in order to break circular dependencies of core services.

Multi-Flock Orchestrator (MFO) 206 may be configured to perform operations to build (e.g., configure) ViBE 202. MFO 206 can obtain applicable flock configs corresponding to various resources to be bootstrapped to the new region (in this case, a ViBE region, ViBE 202). By way of example, MFO 206 may obtain a flock config (e.g., a "ViBE flock config") that identifies aspects of bootstrapping Capabilities Service 208 and Worker 210. As another example, MFO 206 may obtain another flock config corresponding to bootstrapping Domain Name Service (DNS) 212 to ViBE 202.

At step 1, MFO 206 may instruct CIOS Central 214 (e.g., an example of CIOS Central 108 and CIOS Central 214 of FIGS. 1 and 2, respectively). For example, MFO 206 may transmit a request (e.g., including the ViBE flock config) to request bootstrapping of the Capabilities Service 208 and Worker 210 that, at this time do not yet exist in the ViBE 202. In some embodiments, CIOS Central 214 may have access to all flock configs. Therefore, in some examples, MFO 206 may transmit an identifier for the ViBE flock config rather than the file itself, and CIOS Central 214 may independently obtain it from storage (e.g., from DB 308 or flock DB 312 of FIG. 3).

At step 2, CIOS Central 214 may provide the ViBE flock config via a corresponding request to CIOS Regional 216. CIOS Regional 216 may parse the ViBE flock config to identify and execute specific infrastructure provisioning and deployment operations at step 3.

In some embodiments, the CIOS Regional 216 may utilize additional corresponding services for provisioning and deployment. For example, at step 4, CIOS Regional 216 CIOS Regional may instruct deployment orchestrator 218 (e.g., an example of a core service, or other write, build, and deploy applications software, of the host region 204) to execute instructions that in turn cause Capabilities Service 208 and Worker 210 to be bootstrapped within ViBE 202.

At step 5, a capability may be transmitted to the Capabilities Service 208 (from the CIOS Regional 216, Deployment Orchestrator 218 via the Worker 210 or otherwise) indicating that resources corresponding to the ViBE flock are available. Capabilities Service 208 may persist this data. In some embodiments, the Capabilities Service 208 adds this information to a list it maintains of available capabilities with the ViBE. By way of example, the capability provided to Capabilities Service 208 at step 5 may indicate the Capabilities Service 208 and Worker 210 are available for processing.

At step 6, MFO 206 may identify that the capability indicating that Capabilities Service 208 and Worker 210 are available based on receiving or obtaining data (an identifier corresponding to the capability) from the Capabilities Service 208.

At step 7, as a result of receiving/obtaining the data at step 6, the MFO 206 may instruct CIOS Central 214 to bootstrap a DNS service (e.g., DNS 212) to the ViBE 202. The instructions may identify or include a particular flock config corresponding to the DNS service.

At step 8, the CIOS Central 214 may instruct the CIOS Regional 216 to deploy DNS 212 to the ViBE 202. In some embodiments, the DNS flock config for the DNS 212 is provided by the CIOS Central 214.

At step 9, Worker 210, now that it is deployed in the ViBE 202, may be assigned by CIOS Regional 216 to the task of deploying DNS 212. Worker may execute a declarative infrastructure provisioner in the manner described above in connection with FIG. 3 to identify (e.g., from comparing the flock config (the desired state) to a current state of the (currently non-existing) resources associated with the flock) a set of operations that need to be executed to deploy DNS 212.

At step 10, the Deployment Orchestrator 218 may instruct Worker 210 to deploy DNS 212 in accordance with the operations identified at step 9. As depicted, Worker 210 proceeds with executing operations to deploy DNS 212 to ViBE 202 at step 11. At step 12, Worker 210 notifies Capabilities Service 208 that DNS 212 is available in ViBE 202. MFO 206 may subsequently identify that the resources associated with the ViBE flock config and the DNS flock config are available any may proceed to bootstrap any suitable number of additional resources to the ViBE.

After steps 1-12 are concluded, the process for building the ViBE 202 can be considered complete and the ViBE 202 can be considered built.

Figure 3:
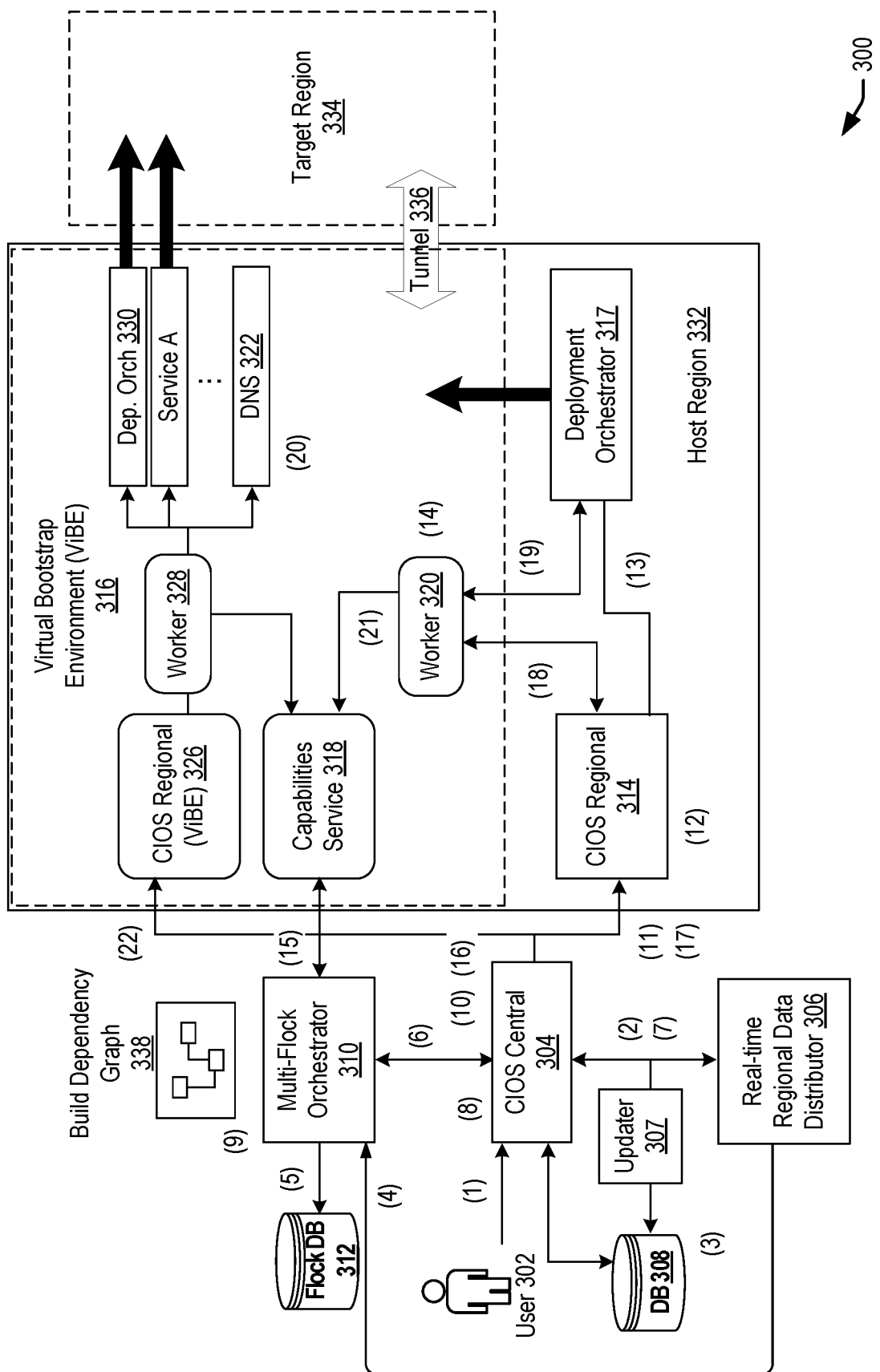
FIG. 3 is a block diagram for illustrating an environment and method for bootstrapping services to a target region utilizing the ViBE, according to at least one embodiment.

FIG. 3 is a block diagram for illustrating an environment 300 and method for bootstrapping services to a target region utilizing the ViBE, according to at least one embodiment.

At step 1, user 302 may utilize any suitable user interface provided by CIOS Central 304 (an example of CIOS Central 108 and CIOS Central 214 of FIGS. 1 and 2, respectively) to modify region data. By way of example, user 302 may create a new region to which a number of services are to be bootstrapped.

At step 2, CIOS Central 304 may execute operations to send the change to RRDD 306 (e.g., an example of RRDD 104 of FIG. 1). At step 3, RRDD 306 may store the received region data in database 308, a data store configured to store region data including any suitable identifier, attribute, state, etc. of a region, AD, realm, ET, or the like. In some embodiments, updater 307 may be utilized to store region data in database 308 or any suitable data store from which such updates may be accessible (e.g., to service teams). In some embodiments, updater 307 may be configured to notify (e.g., via any suitable electronic notification) of updates made to database 308.

At step 4, MFO 310 (an example of the MFO 106 and 206 of FIGS. 1 and 2, respectively) may detect the change in region data. In some embodiments, MFO 310 may be configured to poll RRDD 306 for changes in region data. In some embodiments, RRDD 306 may be configured to publish or otherwise notify MFO 310 of region changes.

At step 5, detecting the change in region data may trigger MFO 310 to obtain a version set (e.g., a version set associated with a particular identifier such as a "golden version set" identifier). identifying a particular version for each flock (e.g., service) that is to be bootstrapped to the new region and a particular version for each artifact corresponding to that flock. The version set may be obtained from DB 312. As flocks evolve and change, the versions for their corresponding configs and artifacts used for region build may change. These changes may be persisted in flock DB 312 such that MFO 310 may identify which versions of flock configs and artifacts to use for building a region (e.g., a ViBE region, a Target Region/non-ViBE Region, etc.). The flock configs (e.g., all versions of the flock configs) and/or artifacts (e.g., all versions of the artifacts) may be stored in DB 308, DB 312, or any suitable data store accessible to the CIOS Central 304 and/or MFO 310.

At step 6, MFO 310 may request CIOS Central 304 to recompile of each of the flock configs associated with the version set with the current region data. In some embodiments, the request may indicate a version for each flock config and/or artifact corresponding to those flock configs.

At step 7, CIOS Central 304 may obtain current region data from the DB 308 (e.g., directly, or via Real-time Regional Data Distributor 306) and retrieve any suitable flock config and artifact in accordance with the versions requested by MFO 310.

At step 8, CIOS Central 304 may recompile the flock configs with the region data obtained at step 7 to inject the flock configs with current region data. CIOS Central 304 may return the compiled flock configs to MFO 310. In some embodiments, CIOS Central 304 may simply indicate compilation is done, and MFO 310 may access the recompiled flock configs via RRDD 306.

At step 9, MFO 310 may perform a static analysis of the recompiled flock configs. As part of the static analysis, MFO 310 may parse the flock configs (e.g., using a library associated with a declarative infrastructure provisioner (e.g., Terraform, or the like)) to identify dependencies between flocks. From the analysis and the dependencies identified, MFO 310 can generate Build Dependency Graph 338. Build Dependency Graph 338 may be an acyclic directed graph that identifies an order by which flocks are to be bootstrapped (and/or changes indicated in flock configs are to be applied) to the new region. Each node in the graph may correspond to bootstrapping any suitable portion of a particular flock. The specific bootstrapping order may be identified based at least in part on the dependencies. In some embodiments, the dependencies may be expressed as an attribute of the node and/or indicated via edges of the graph that connect the nodes. MFO 310 may traverse the graph (e.g., beginning at a starting node) to drive the operations of the region build.

In some embodiments, MFO 310 may utilize a cycle detection algorithm to detect the presence of a cycle (e.g., service A depends on service B and vice versa). MFO 310 can identify orphaned capabilities dependencies. For example, MFO 310 can identify orphaned nodes of the Build Dependency Graph 338 that do not connect to any other nodes. MFO 310 may identify falsely published capabilities (e.g., when a capability was prematurely published and the corresponding functionality is not actually yet available). MFO 310 can detect from the graph that one or more instances of publishing the same capability exist. In some embodiments, any suitable number of these errors may be detected and MFO 310 (or another suitable component such as CIOS Central 304) may be configured to notify or otherwise present this information to users (e.g., via an electronic notification, a user interface, or the like). In some embodiments, MFO 310 may be configured to force delete/recreate resources to break circular dependencies and may once again provide instructions to CIOS Central 304 to perform bootstrapping operations for those resources and/or corresponding flock configs.

A starting node may correspond to bootstrapping the ViBE flock, a second node may correspond to bootstrapping DNS. The steps 10-15 correspond to deploying (via deployment orchestrator 317, an example of the deployment orchestrator 218 of FIG. 2) a ViBE flock to ViBE 316 (e.g., an example of ViBE 116 and 202 of FIGS. 1, and 2, respectively). That is, steps 10-15 of FIG. 3 generally correspond to steps 1-6 of FIG. 2. Once notified that capabilities exist corresponding to the ViBE flock being deployed (e.g., indicating that Capabilities Service 318 and Worker 320, corresponding to Capabilities Service 208 and Worker 210 of FIG. 2, are available) the MFO 310 recommence traversal of the Build Dependency Graph 338 to identify next operations to be executed.

By way of example, MFO 310 may continue traversing the Build Dependency Graph 338 to identify that a DNS flock is to be deployed. Steps 16-21 may be executed to deploy DNS 322 (an example of the DNS 212 of FIG. 2). These operations may generally correspond to steps 7-12 of FIG. 2.

At step 21, a capability may be stored indicating that DNS 322 is available. Upon detecting this capability, MFO 310 may recommence traversal of the Build Dependency Graph 338. On this traversal, the MFO 310 may identify that any suitable portion of an instance of CIOS Regional (e.g., an example of CIOS Regional 314) is to be deployed to the ViBE 316. In some embodiments, steps 16-21 may be substantially repeated with respect to deploying CIOS Regional (ViBE) 326 (an instance of CIOS Regional 314, CIOS Regional 110 of FIG. 1) and Worker 328 to the ViBE 316. A capability may be transmitted to the Capabilities Service 318 that CIOS Regional (ViBE) 326 is available.

Upon detecting the CIOS Regional (ViBE) 326 is available, MFO 310 may recommence traversal of the Build Dependency Graph 338. On this traversal, the MFO 310 may identify that a deployment orchestrator (e.g., Deployment Orchestrator 330, an example of the Deployment Orchestrator 317) is to be deployed to the ViBE 316. In some embodiments, steps 16-21 may be substantially repeated with respect to deploying Deployment Orchestrator 330. Information that identifies a capability may be transmitted to the Capabilities Service 318, indicating that Deployment Orchestrator 330 is available.

After Deployment Orchestrator 330 is deployed, ViBE 316 may be considered available for processing subsequent requests. Upon detecting Deployment Orchestrator 330 is available, MFO 310 may instruct subsequent bootstrapping requests to be routed to ViBE components rather than utilizing host region components (components of host region 332). Thus, MFO 310 can continue traversing the Build Dependency Graph 338, at each node instructing flock deployment to the ViBE 316 via CIOS Central 304. CIOS Central 304 may request CIOS Regional (ViBE) 326 to deploy resources according to the flock config.

At some point during this process, Target Region 334 may become available. Indication that the Target Region is available may be identifiable from region data for the Target Region 334 being provided by the user 302 (e.g., as an update to the region data). The availability of Target Region 334 may depend on establishing a network connection between the Target Region 334 and external networks (e.g., the Internet). The network connection may be supported over a public network (e.g., the Internet), but use software security tools (e.g., IPSec) to provide one or more encrypted tunnels (e.g., IPSec tunnels such as tunnel 336) from the ViBE 316 to Target Region 334. As used herein, "IPSec" refers to a protocol suite for authenticating and encrypting network traffic over a network that uses Internet Protocol (IP), and can include one or more available implementations of the protocol suite (e.g., Openswan, Libreswan, strong-Swan, etc.). The network may connect the ViBE 316 to the service enclave of the Target Region 334.

Prior to establishing the IPSec tunnels, the initial network connection to the Target Region 334 may be on a connection (e.g., an out-of-band VPN tunnel) sufficient to allow boot-strapping of networking services until an IPSec gateway may be deployed on an asset (e.g., bare-metal asset) in the Target Region 334. To bootstrap the Target Region's 334 network resources, Deployment Orchestrator 330 can deploy the IPSec gateway at the asset within Target Region 334. The Deployment Orchestrator 330 may then deploy VPN hosts at the Target Region 334 configured to terminate IPSec tunnels from the ViBE 316. Once services (e.g., Deployment Orchestrator 330, Service A, etc.) in the ViBE 316 can establish an IPSec connection with the VPN hosts in the Target Region 334, bootstrapping operations from the ViBE 316 to the Target Region 334 may begin.

In some embodiments, the bootstrapping operations may begin with services in the ViBE 316 provisioning resources in the Target Region 334 to support hosting instances of core services as they are deployed from the ViBE 316. For example, a host provisioning service may provision hypervisors on infrastructure (e.g., bare-metal hosts) in the Target Region 334 to allocate computing resources for VMs. When the host provisioning service completes allocation of physical resources in the Target Region 334, the host provisioning service may publish information indicating a capability that indicates that the physical resources in the Target Region 334 have been allocated. The capability may be published to Capabilities Service 318 via CIOS Regional (ViBE) 326 (e.g., by Worker 328).

With the hardware allocation of the Target Region 334 established and posted to capabilities service 318, CIOS Regional (ViBE) 326 can orchestrate the deployment of instances of core services from the ViBE 316 to the Target Region 334. This deployment may be similar to the processes described above for building the ViBE 316, but using components of the ViBE (e.g., CIOS Regional (ViBE) 326, Worker 328, Deployment Orchestrator 330) instead of components of the Host Region 332 service enclave. The deployment operations may generally correspond to steps 16-21 described above.

As a service is deployed from the ViBE 316 to the Target Region 334, the DNS record associated with that service may correspond to the instance of the service in the ViBE 316. The DNS record associated with the service may be updated at a later time to complete deployment of the service to the Target Region 334. Said another way, the instance of the service in the ViBE 316 may continue to receive traffic (e.g., requests) to the service until the DNS record is updated. A service may deploy partially into the Target Region 334 and publish information indicating a capability (e.g., to Capabilities Service 318) that the service is partially deployed. For example, a service running in the ViBE 316 may be deployed into the Target Region 334 with a corresponding compute instance, load balancer, and associated applications and other software, but may need to wait for database data to migrate to the Target Region 334 before being completely deployed. The DNS record (e.g., managed by DNS 322) may still be associated with the service in the ViBE 316. Once data migration for the service is complete, the DNS record may be updated to point to the operational service deployed in the Target Region 334. The deployed service in the Target Region 334 may then receive traffic (e.g., requests) for the service, while the instance of the service in the ViBE 316 may no longer receive traffic for the service.

Multi-Flock Orchestration with Version Sets

Figure 4:
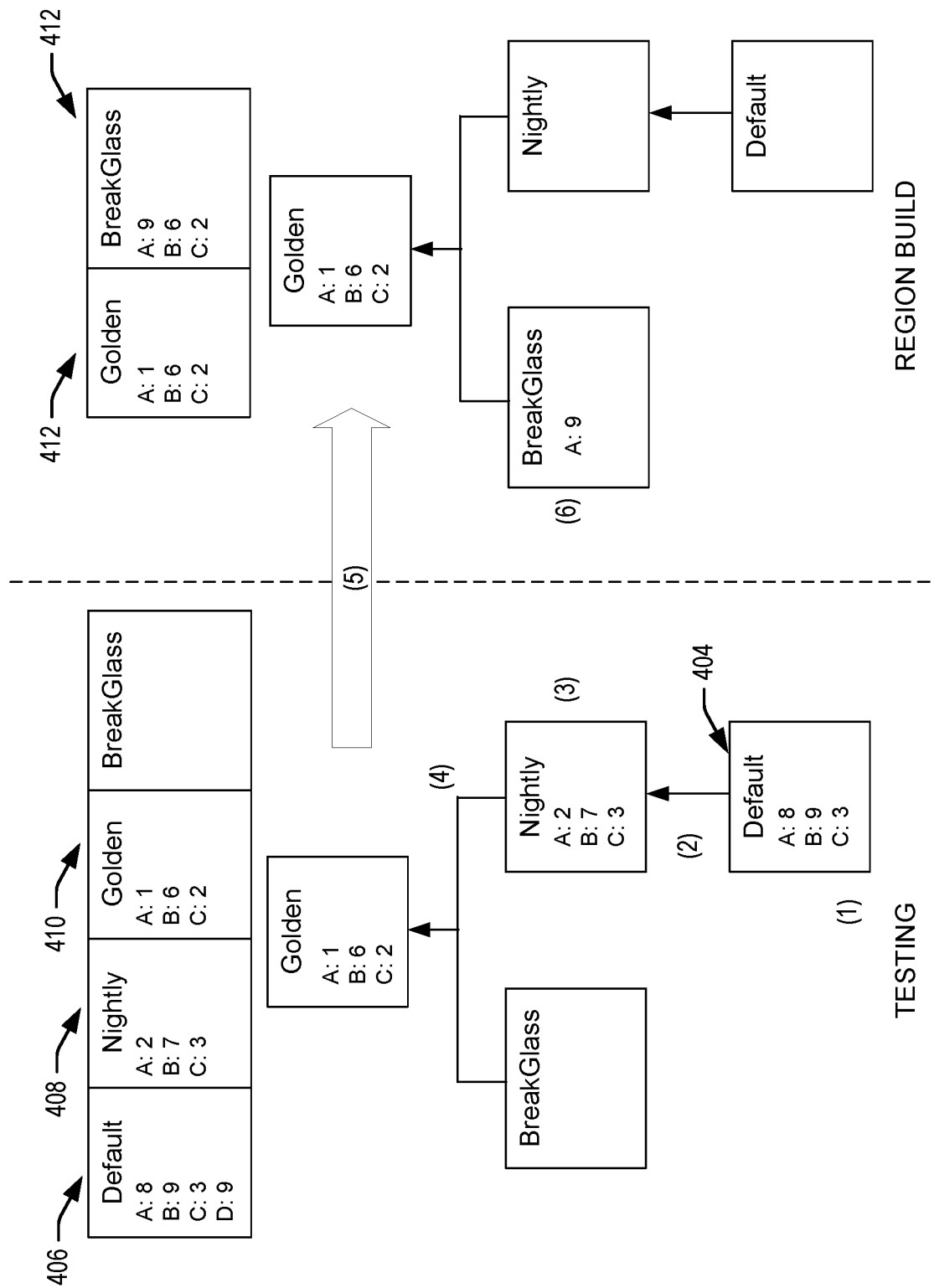
FIG. 4 is a block diagram depicting an example method for maintaining multiple version sets that identify which configuration file versions and corresponding artifacts are to be utilized for bootstrapping services to the target region, according to at least one embodiment.

FIG. 4 is a block diagram depicting an example method 400 for maintaining multiple version sets, according to at least one embodiment. The method 400 may be performed by any suitable component of the Cloud Infrastructure Orchestration Service 102 of FIG. 1. In some embodiments, method 400 may be performed by the Multi-Flock Orchestrator 106 of FIG. 1. A version set refers to a snapshot of all artifacts and configuration files (e.g., flock configuration files, referred to herein for brevity as "flock configs") to be used to perform a region build. The flock configs and/or artifacts provided in the version set may be associated with a version identifier that identifies a particular version of the artifact and/or flock config from other versions of that artifact or flock config. For example, a flock config may be associated with an identifier "Service 1," but have multiple versions (e.g., version 1, version 2, version 3.1, etc.). A Multi-Flock Orchestrator (e.g., MFO 106, 206, and 310 of FIGS. 1, 2, and 3, respectively) may be configured to manage multiple version sets corresponding to potentially different flock configs and/or versions of flock configs, or artifacts and/or versions of artifacts to be utilized. A version set could be used to perform a region build while a different version set can be used for testing and integration efforts. By tracking different version sets, The Multi-Flock Orchestrator can ensure that a stable version set is used for region build (e.g., a version set that is likely to produce a successful region build). A version set may be associated with an identifier with which it can be referenced (e.g., "us-ashburn-1") and a scope identifier. Example scope identifiers can include, but are not limited to, "golden," "nightly," "break-glass," and "default," although other identifiers can be used. One scope identifier (e.g., golden) can indicate a version set to be used for region build. Another scope identifier, (e.g., nightly) may indicate a version set to be used for testing (e.g., a unit test run every night). Another scope identifier (e.g., break-glass) may indicate a version set that can be used to recover from an error experienced during region build. Another scope identifier (e.g., default) may indicate a version set of flock configs/artifacts to be tested in the hope of eventual inclusion in a region build.

At step 1, each service team may publish flock config data (e.g., a flock config identifier and a corresponding version identifier that uniquely identifies a particular version of the flock config from other versions of the flock config). In some embodiments, publishing the flock config data may be performed by utilizing an application programming interface (API) call or another suitable function call. By executing this call, the flock config data (e.g., flock config identifier and version identifier) may be added to a default version set (e.g., default version set 402). In some embodiments, the default version set 402 may be stored in DB 312 of FIG. 3 or any suitable data store. As another example, a particular version of a flock config may be manually modified (e.g., with a label/tag) that indicates the flock config should be included in the default version set. The Multi-Flock Orchestrator may parse all flock configs to identify the set to be associated with the default version set. As depicted in default version set 404, "A"-"D" correspond to a flock config identifier associated with respective flocks, while "8", "9," and "3" provided in default version set 402 refer to a version of the flock config. Thus, flock config A, version 8, flock config B, version 9, and flock config C, version 2 may be added to the default version set 404. The default version set may previously include flock config "D", version 9. The default version set maintained after step 1 is depicted at 406.

At step 2, any suitable operations may be executed to determine a nightly version set for testing. By way of example, the set of flock config identifiers and corresponding version identifiers may be copied from the default version set (e.g., depicted at 406) to a nightly version set (e.g., nightly version set 408). In some embodiments, the nightly version set may be associated with a validation process (e.g., a nightly unit and/or integration test conducted according to a predefined scheduled). It should be appreciated, that the nightly version set may correspond to any suitable validation process, not necessarily one that is performed every night. The nightly version set may identify flock config identifiers and versions for each service of a region build. As depicted at 408, when a test was initiated, the nightly version set may have included flock config A, version 2, flock config "B," version 7, and flock config "C," version 3. Although different versions may have subsequently been used (as depicted at 406), the default version set at the time the test is initiated is the set that is copied to the nightly version set. Services may be bootstrapped within a test environment using the flock configs identified by the nightly version set (and corresponding artifact versions identified within those flock configs) and this version of the region may validated.

At step 3, a validation process (including one or more unit and/or integration tests) may be run to validate the services bootstrapped in the test environment. In some embodiments, the validation process may include any suitable predefined operations. These operations may be directed to testing various functionality corresponding to the services identified by the nightly version set. The Multi-Flock Orchestrator (MFO) may identify one or more errors provided as output of the validation process. These errors may correspond to one or more services. In some embodiments, if an error corresponding to a particular service is identified, the MFO may be configured to restrict that version of the flock config from being promoted/copied to a golden version set maintained by the MFO and used for subsequent region builds.

At step 4, after concluding the validation process at step 3, MFO may be configured to determine a golden version set. If a service successfully passes the validation process (e.g., by producing no, or at least acceptable, errors), MFO may copy the corresponding flock config data (e.g., config identifier and version identifier) to the golden version set. If a service failed the validation process (e.g., by producing errors, or at least unacceptable errors), MFO may maintain a last known version of the flock config known to have passed the validation process. For example, if flock config "A," version 1 passes the validation process, it may be promoted to the golden version set. Subsequently, flock config "A," version 2 may be published to the default version set and later promoted to the nightly version set. However, if flock config "A," version 2 fails the validation process (e.g., produces one or more unacceptable errors), flock config "A," version 2 may not be promoted to the golden version set. Instead, MFO may maintain flock config "A," version 1 within the golden version set (e.g., the golden version set depicted at 410).

At step 5, upon initiating a region build (e.g., initiated by the MFO upon identifying new region data, or otherwise), the golden version set may be copied and/or obtained by the MFO to be utilized for the region build. This process may generally correspond to step 5 of FIG. 5 described above.

The golden version set may be utilized for region build. In some embodiments, a service team may identify an error in a flock config and may provide an updated (or different) version of the flock config. At step 6, the updated flock config can be added to a Break Glass version set. This Break Glass version set may be used as an override any suitable flock config of the Golden version set. By way of example, at step 6, flock config "A," version 9 may be added to the Break Glass version set. Version 9 of flock config "A" may differ from version 1 of the golden version set as depicted at 412. Adding version 9 of flock config "A" to the Break Glass version set may trigger MFO to regenerate the Build Dependency Graph 314 through performing a static analysis of the set of flock configs of the Break Glass version set depicted at 414, where flock config "A," version 1 is replaced with flock config "A," version 9. In some embodiments, MFO may execute regenerate the Build Dependency Graph 314 and/or any suitable data structure for managing bootstrapping operations (e.g., one or more data structures generated and/or utilized by the declarative infrastructure provisioner 315 of FIG. 3) may be regenerated. Any data structure that has been regenerated may be traversed in a similar manner as described above where a node is visited. If a capability associated with the node (e.g., a capability on which the service corresponding to the node depends) is available (as identified through conferring with Capabilities Service 112 of FIG. 1), the traversal may proceed to the next node where the same evaluation may take place. This process may be continued until a node is reached for which a capability on which the node depends is determined to be unavailable. At this point, MFO may pause the traversal until it ascertains that the capability is available (e.g., by polling and/or by being notified by the Capabilities Service 112). By way of example, MFO may transmit a request to the Capabilities Service 112 to be notified when the capability on which the node depends is available and the Capabilities Service 112 may be configured to provide the corresponding notification when it receives data indicating the capability is available. Alternatively, MFO may transmit one or more requests at any suitable predefined schedule or frequency to request the status of the capability (or any suitable combination of capabilities such as all capabilities) from the Capabilities Service 112. In some embodiments, MFO may receive data from the Capabilities Service 112 at any suitable time indicating the status of the capability (e.g., the capability is available or unavailable). In some embodiments, the Capabilities Service 112 may indicate in any suitable transmission the status of any suitable number of capabilities.

Through utilizing the various version sets depicted in FIG. 4, Multi-Flock Orchestrator (MFO) can reduce the number of errors and/or the likelihood of producing errors during a region build. This is achieved through enabling new flock configs (including potentially new artifact versions) to be nominated through inclusion of the default version, performing a validation process on a nightly version set produced from the versions provided in the default version set, and promoting only successful flock config versions to the golden version set with which subsequent region builds may be performed.

Figure 5:
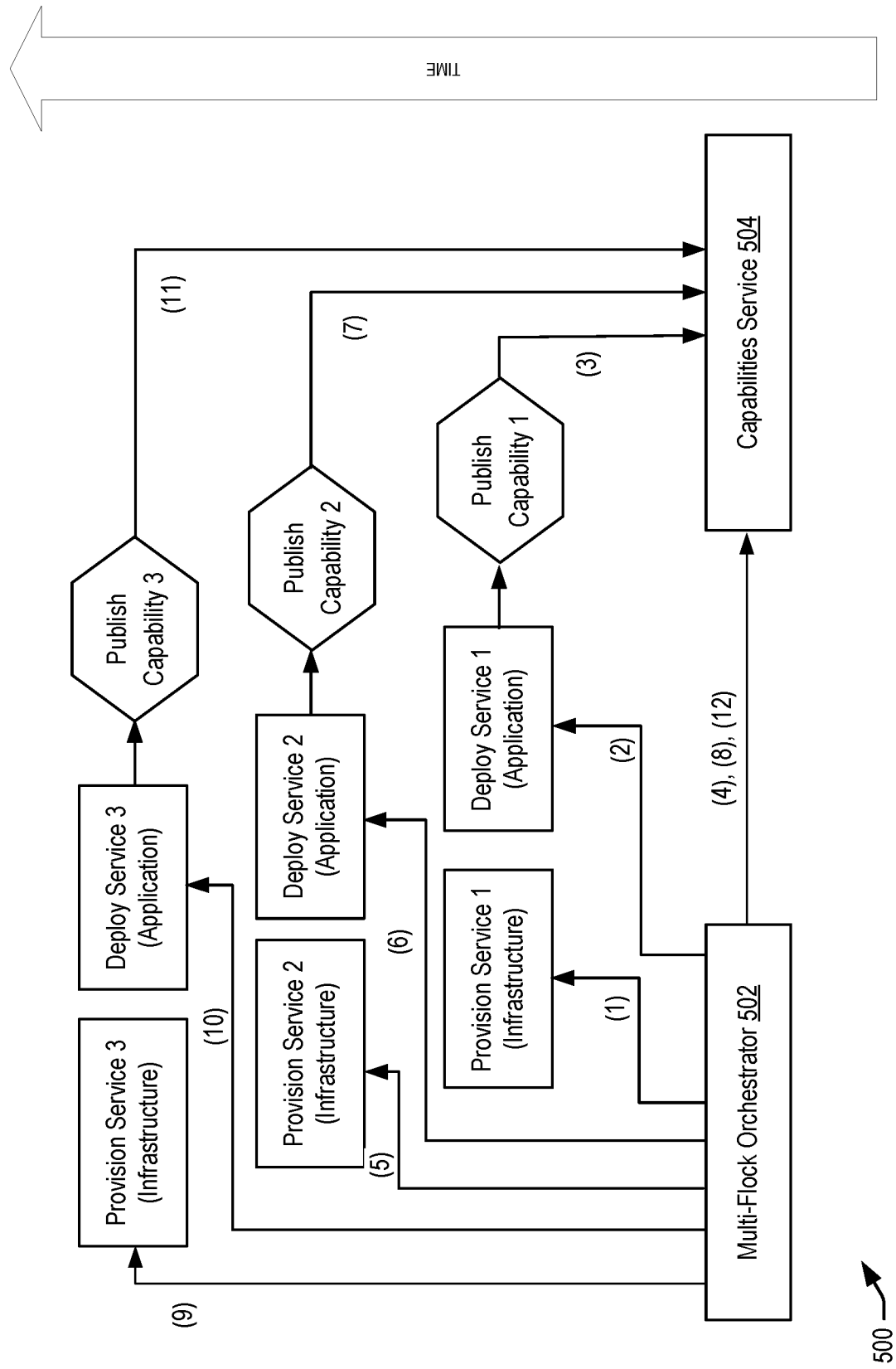
FIG. 5 is a block diagram depicting an example flow for executing operations for provisioning and deploying a number of services to a region, according to at least one embodiment.

FIG. 5 is a block diagram depicting an example method 500 for executing operations for bootstrapping (e.g., provisioning and deploying) resources to a region, according to at least one embodiment. The method 500 may be performed by the Multi-Flock Orchestrator 502 (an example of the Multi-Flock Orchestrator 106 of FIG. 1). Capabilities Service 504 may be an example of the Capabilities Service 112 of FIG. 1. Prior to performing the operations of method 500, steps 1-9 of FIG. 5 may be executed. Thus, a static analysis may be performed (e.g., by the Multi-Flock Orchestrator 502). The term "static analysis" is intended to refer to operations for identifying, from program code (e.g., configuration files such as flock configs), a set of dependencies between bootstrapping operations. Performing a static analysis for a region build may include obtaining a set of configuration files (e.g., flock configs corresponding to a golden version set, described above in connection with FIG. 4) and parsing those files to identify explicit and/or implicit dependencies between resources defined therein. In some embodiments, the configuration files may identify optional and/or required dependencies. An optional dependency may identify a dependency that may optionally ignored or enforced. Required dependencies indicate that the dependency is to be enforced without exception. In some embodiments, the Multi-Flock Orchestrator 502 may generate one or more records for maintaining and/or enforcing these dependencies. For example, the Multi-Flock Orchestrator 502 may generate a graph (e.g., Build Dependency Graph 314 of FIG. 3, a data structure that is an example of a record, etc.) based on the identified dependencies. Each node in the graph may correspond to provisioning and/or deployment operations for a service. In some embodiments, separate graphs may be maintained for provisioning versus deployment operations. Example techniques for generating and/or utilizing these records (e.g., data structures) are provided in U.S. Patent Provisional Application No. 63/315,034, entitled "Techniques for Managing Region Build Dependencies," the entire contents of which are incorporated by reference for all purposes. Although the following example utilizes a directed graph, any suitable record for maintaining dependencies between the services/flocks may be utilized. In some embodiments, the method 500 may begin based at least in part on the Multi-Flock Orchestrator (MFO) 502 identifying that a first node of the directed graph indicates a flock which has no dependencies.

It should be appreciated that a flock config may be used to encapsulate/identify a set of resources to be bootstrapped. While in some cases, the flock config may identify all resources of a service, it need not necessarily be the case that all resources of a service be included in a single flock config.

At step 1, MFO 502 may execute instructions to provision infrastructure components according to a first flock config. By way of example, MFO 502 may instruct and/or request a CIOS Central (e.g., CIOS Central 108, 214, and 304 of FIGS. 1-3, respectively) to bootstrap infrastructure components for service 1. In some embodiments, the instructions/request may include the flock config to be utilized, or the request may indicate a version corresponding to the flock config to be utilized. If a version is identified, the CIOS Central (not depicted here) may obtain the flock config corresponding to the version requested (e.g., from DB 308 or 312 of FIG. 3, etc.). Subsequently, the CIOS Central may proceed to instruct/request provisioning of the infrastructure resources for service 1 from a CIOS Regional (e.g., an example of the CIOS Regional 110, 216, and/or 314 of FIGS. 1-3, respectively) in a similar manner as discussed above in connection with FIGS. 2 and 3 (e.g., after real-time region data is injected in the flock config).

At step 2, MFO 502 may instruct/request the CIOS Central to deploy one or more artifacts to the infrastructure components provisioned at step 1. As in step 1, the request may include the flock config to be utilized (or a version identifier for the flock config to be utilized) and/or a version identifier for each artifact to be deployed. The request in step 1 and in step 2 may each have an indicator that identifies the request as corresponding to a provisioning request (e.g., a request to provision infrastructure components) or a deployment request (e.g., a request to deploy various artifacts such as applications, configuration files, or the like). In some embodiments, the MFO 502 may make a single request for bootstrapping service 1 which indicates a request to provision the infrastructure components for the service as well as a deployment request to deploy various artifacts to those infrastructure components. Therefore, in some examples, steps 1 and 2 may be performed with a single request from MFO 502 to CIOS Central. In other embodiments, each of steps 1 and 2 (or steps 1 and 2, collectively, if issued together) may correspond to a "pass" of MFO 502 through the graph. As a non-limiting example, a first pass of traversing the graph may cause the operations of step 1 to be executed, while a second pass of the graph may cause the operations of step 2 to be executed.

At step 3, a capability (capability 1) may be published to Capabilities Service 504 (e.g., an example of the Capabilities Service 112, 208, and/or 318 of FIGS. 1-3, respectively). Publishing the capability may include calling an application programming interface (API) or another function call with an identifier for the capability (referred to as a "capability identifier"). The capability identifier may be in any suitable form such as an alphanumeric value of any suitable length. The capability identifier may be associated with particular functionality. In some embodiments, the capability may be published as one or more artifacts are being deployed. The capability can be associated with a portion of the functionality provided by the service or the capability can indicate all of the functionality of the service is available. In some embodiments, multiple capabilities may be published at step 3 as part of bootstrapping service 1 (e.g., as infrastructure is provisioned and/or as artifacts are deployed for service 1). The particular computing component that publishes the capability may be any suitable component of CIOS 102 of FIG. 1 (e.g., CIOS Regional 110, or, if a ViBE is used, CIOS Regional 216 or 314 of FIGS. 2 and 3, or CIOS Regional (ViBE) 326 of FIG. 3, the deployment orchestrator 218, 317, os 330 of FIGS. 2 and 3, respectively, or the like).

At step 4, MFO 502 may poll or otherwise request an indication of available capabilities. This request may be made at any suitable time, according to a predefined periodicity, according to a predefined schedule, or the like. In some embodiments, the request may cause Capabilities Service 504 to provide a list of all capability identifiers that have been published/received. In some embodiments, the request can include a specific capability identifier and the response provided can indicate whether or not that capability identifier has been published (e.g., the capability has been published, the capability is available, etc.).

MFO 502 may assess, via the graph it is using to drive the region build (e.g., Build Dependency Graph 314) whether other resources are dependent on the capability identified at step 4. For example, the graph may indicate that service 2 is dependent functionality associated with service 1. This dependency may be expressed as a capability. By way of example, the graph may maintain an association with service 2 that indicates it cannot be bootstrapped until a capability is published (e.g., capability "1234") that indicates service 1 is fully (or partially) bootstrapped/operational. Upon identifying that the required capability (e.g., capability "1234") is available via step 4, the MFO 502 may continue its traversal of the graph, proceeding to step 5.

In some embodiments, the MFO 502 may identify that a capability is unavailable. In some embodiments, the MFO 502 may publish to the Capabilities Service 504 an indication that the capability is needed. MFO 502 may traverse the graph to identify that service 2 is dependent on service 1 (e.g., corresponding to capability "1234"). In some embodiments, MFO 502 may pause traversal of the graph while awaiting the capability that indicates service 1 is available. As various resources of the region become available, capabilities may be published to Capabilities Service 504 indicating that these capabilities have become available. In some embodiments, when the Capabilities Service 504 identifies that the particular capability has become available, it may transmit data via any suitable electronic method such as via an application programming interface, via a function call, or the like to notify MFO 502 of the same. Additionally, or alternatively, the MFO 502 may poll for or request identification of available capabilities (e.g., of a particular set of one or more capabilities) periodically and/or the Capabilities Service 504 may publish available capabilities periodically. MFO 702 may deem a capability as being unavailable and may refrain from further traversal of the graph (or at least traversal of a particular path of the graph) until the Capabilities Service 504 provides data indicating the capability is available. When MFO 702 identifies that a capability has become available (e.g., based on the data provided by the Capabilities Service 504), it may continue its traversal of the graph, identifying that additional service may now be bootstrapped.

Steps 5, 6, and 7 may generally correspond to steps 1, 2, and 3 but in the context of bootstrapping service 2. As discussed above, steps 5 and 6 may be performed separately, or as a single request. At step 7, capability 2 may be published indicating that some or all of the functionality of service 2 is available. As discussed above, Capabilities Service 504 may persist this capability information.

At step 8, MFO 502 may determine that the capability associated with service 2 is available. As discussed above, MFO 502 may request this information (e.g., specifically by capability identifier, or via obtaining a list of available capabilities) or the Capabilities Service 504 may notify MFO 502 of the availability of the capability. In some embodiments, Capabilities Service 502 may notify MFO 502 specifically, or the capability may be broadcasted to one or more computing components (including the MFO 502) that the capability associated with service 2 is available.

Steps 9, 10, 11 generally correspond to steps 1, 2, and 3, and/or 5, 6, and 7, but in the context of bootstrapping service 3. Step 12 may correspond to steps 4 and 8.

The operations of method 500 may be performed any suitable number of times. By way of example, steps 1-4 may be performed any suitable number of times (e.g., for each service to be bootstrapped in the region) in accordance with the traversal of the graph MFO 502 is using to drive the region build. It should be appreciated that in some embodiments, any suitable portion of the steps of FIG. 5 may be performed in parallel rather than in the sequential manner depicted in FIG. 5. For example, if the resources of services 1-3 have no dependencies, or all of the capabilities on which they depend are available, it may be the case that at least some portion of bootstrapping operations performed for each service could be performed in a substantially parallel fashion. The method 500 may be utilized to bootstrap services and/or resources to a ViBE (e.g., the ViBE 524 of FIG. 5) or directly to a new region without using a ViBE (e.g., if the new region is communicatively available).

Figure 6:
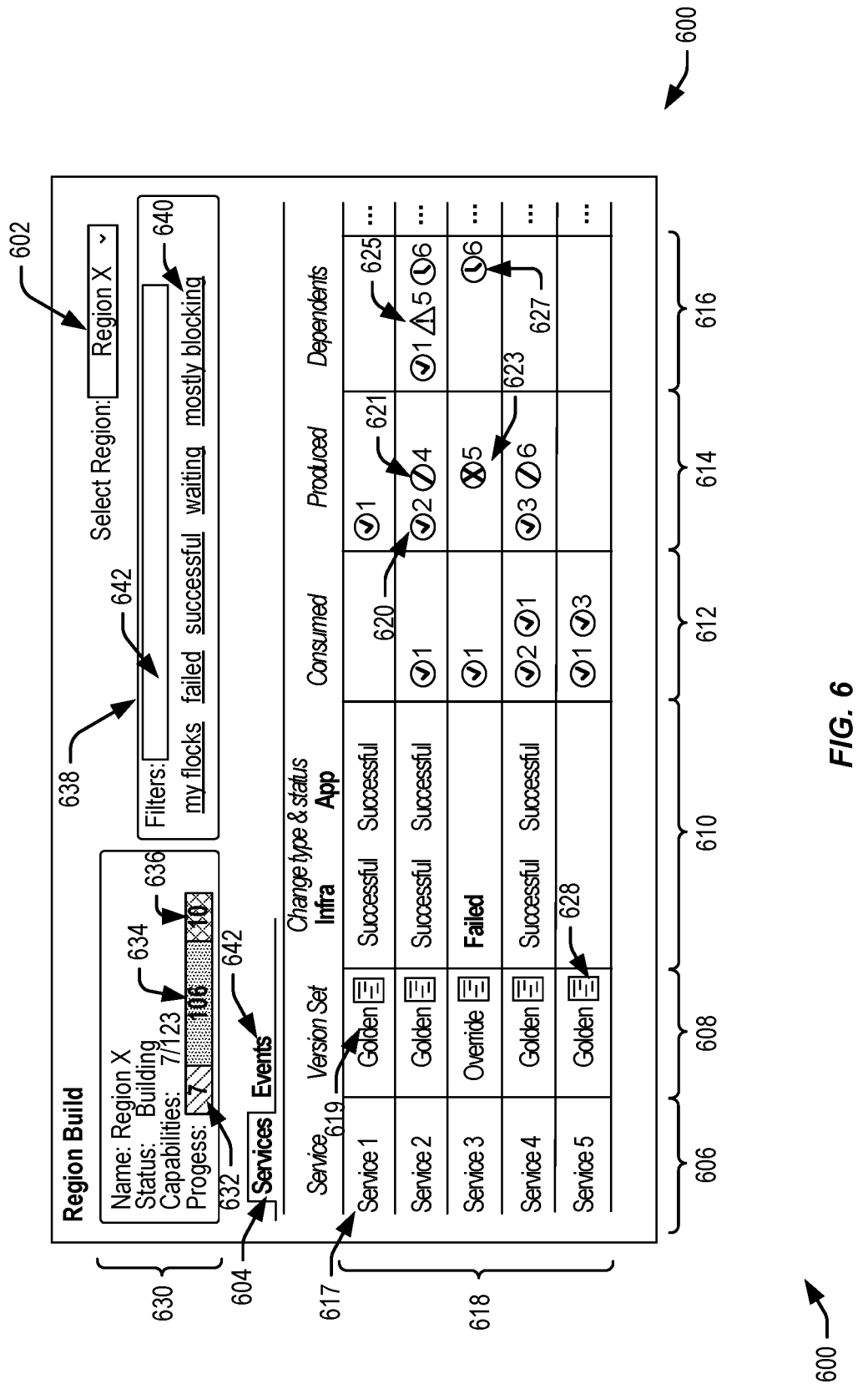
FIG. 6 is a block diagram depicting an example interface presenting information related to services associated with a region build, according to at least one embodiment.

FIG. 6 is a block diagram depicting an example user interface 600 presenting information related to services associated with a region build, according to at least one embodiment. In some embodiments, the UI 600 may be hosted by any suitable component of the Cloud Infrastructure Orchestration Service 102 of FIG. 1 (e.g., CIOS Central 108, 214, and/or 304 of FIGS. 1-3, respectively). Any suitable data corresponding to a region build may be presented at user interface (UI) 600. In some embodiments, UI 600 may include a UI element (e.g., UI element 602, a drop-down menu) for selecting a particular region build. Upon selecting a particular region build (e.g., Region X) from the UI element 602, data corresponding to that region build may be presented at the UI 600.

The data presented at UI 600 may initially correspond to a "Services" tab (e.g., Service Tab 604). In some embodiments, Service Tab 604 may include any suitable information corresponding to the services being bootstrapped in the selected region. As a non-limiting example, Service Tab 604 may include columns 606-616 corresponding to a service identifier (column 606), a version set identifier (column 608), a change type (e.g., infrastructure or application/artifact) and status (e.g., successful/failed) (column 610), consumed capabilities (column 612), produced capabilities (column 614), and dependents (column 616, In some embodiments, column 606 provides an identifier for each service being bootstrapped in the selected region. In some embodiments, clicking on a service identifier (e.g., service identifier 617) may cause the UI to filter the data provided at UI 600 within area 618 to only data associated with the selected service identifier. Selecting version set identifier 619 may cause the UI 600 to display (e.g., via a popup window) version identifiers for the flock config and/or artifacts associated with the given service and the version set identifier 619.

Column 608 presents a version set identifier (e.g., version set identifier 619, "Golden") indicating a currently active version set for the service. In some embodiments, an option may be selected that compares the current version set (e.g., Golden) to any other selected version set identifier associated with the service such that a user may view and/or compare two version sets associated with the same service. In some embodiments, an icon (e.g., icon 628) may be presented within column 608 for each service. Selecting the icon may cause a popup or other suitable interface to be presented to display version set information. For example, an identifier for the flock config (e.g., the specific version being used in the "Golden" version set) may be identified and/or one or more artifact identifiers and corresponding versions may be presented. In some embodiments, selecting icon 628 may present version set information corresponding to any suitable number of version sets. For example, selecting the icon 628 may provide a popup or other user interface within which information associated with the "Golden" version set may be provided. In some embodiments, if the service is related to any other version sets (e.g., a Break Glass version set) the information corresponding to the other version set(s) may also be displayed. Thus, the user may access information corresponding to any suitable version set (e.g., including a flock identifier identifying the flock config, a version identifier corresponding to the flock config, and data corresponding to any suitable number of artifacts that are referenced by that flock config. An instance of artifact data may include an identifier for the artifact (e.g., application A) and a version identifier (e.g., version 1) corresponding to a version of the artifact. In some embodiments, the version set information may include a release identifier corresponding to a release associated with the service. A release Column 610 presents information related to the provisioning of infrastructure and the deployment of artifacts (e.g., applications, configuration files, etc.) for the service. In some embodiments, an identifier (e.g., a release identifier identifying a particular release corresponding to the infrastructure and/or the artifacts) may be indicated in column 610. A status may indicate a current status of operations corresponding to the release.

Column 612 presents indicators identifying which capabilities have been consumed. Consumed capabilities are capabilities on which the corresponding service depends which have been processed. Said another way, consumed capabilities indicate capabilities published in relation to other services on which the current service depends.

Column 614 presents indicators identifying which capabilities the service has produced. Produced capabilities are capabilities which have been published in the course of bootstrapping the given service. Other services may depend on one or more of these produced capabilities.

In some embodiments, an icon can appear next to a capability identifier that indicates a status. By way of example, icon 620 may indicate that a capability was successfully consumed/produced. As depicted in FIG. 6, icon 620 indicates that capability 2 was successfully produced. Similarly, icon 621, as presented in FIG. 6, indicates that a capability (e.g., capability 5) has not yet been produced. Icon 623 can be used to indicate a capability has failed (e.g., has failed to be produced, or has failed to be consumed). Icon 625 can be used to indicate a capability on which the service depends has failed. Icon 627 can be used to indicate a dependency on a capability that has yet to be produced. Selecting any of the icons/capability indicators may cause a popup or other display to be presented that indicates the services corresponding to the selected capability. For example, selecting the icon 627 (or the indicator corresponding to the icon 627) may cause a popup window to be provided that lists all of the services which depend on that capability (in this example, service 2 and 3).

UI 600 may include area 630. Area 630 may be configured to present any suitable information associated with the region. By way of example, area 630 may indicate a status of the region build (e.g., None, Building, Production, Paused, Deprecated, etc.), a number of capabilities that have been published (e.g., 3), a number of total capabilities that are expected to be published (e.g., 123), In some embodiments, area 630 may present a progress indicator that indicates a status of the capabilities. Portion 632 of the progress indicator may indicate successfully published capabilities. Portion 632 of the progress indicator may indicate successfully published capabilities. Portion 634 of the progress indicator may indicate capabilities that have not yet published. Portion 636 of the progress indicator may indicate failed capabilities.

UI 600 may include area 638. Area 638 may include any suitable UI elements for filtering the data presented in area 618. The user may define a set of filters associated with an identifier. These predefined filter sets may be presented (e.g., by identifier) within area 638, as depicted at 640. In some embodiments, user input may be provided by selecting UI element 642. The user may enter any suitable filters via this element with which the data presented in area 618 may be filtered.

Figure 7:
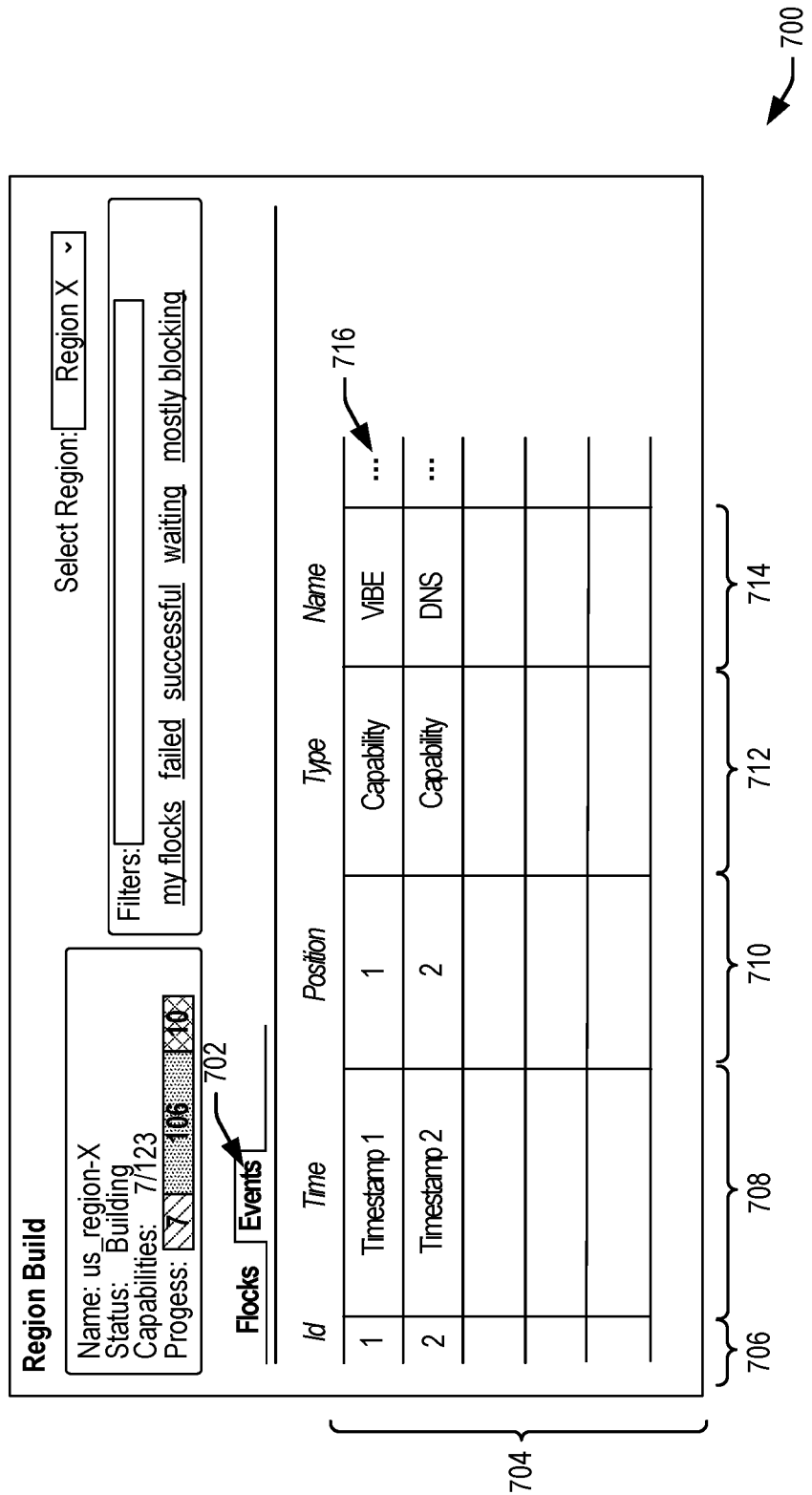
FIG. 7 is a block diagram depicting an example interface presenting information related to events associated with a region build, according to at least one embodiment.

Selecting Events Tab 642 may cause the user to be navigated to the user interface (UI) 700 of FIG. 7.

FIG. 7 is a block diagram depicting an example user interface 700 presenting information related to events associated with a region build, according to at least one embodiment. UI 700 may present a view of the Events Tab after selection via UI 600. Upon selecting Events Tab 702 (corresponding to Events Tab 642 of FIG. 6), data may be presented in area 704. Events may correspond to capabilities.

Events Tab 702 may include columns 706-714 corresponding to an event identifier (column 706), a time/timestamp corresponding to a time at which the event was received (column 708), a position (column 710) indicating an order by which the capabilities are supposed to be published, a type (column 712) indicating a type of event (e.g., capability), a name (column 714) or other identifier identifying a particular service (flock config) the event is associated with (e.g., published due to bootstrapping the service). Any suitable information associated with the event that is not presented in area 704 may be viewed based on selection the option 716.

Figure 8:
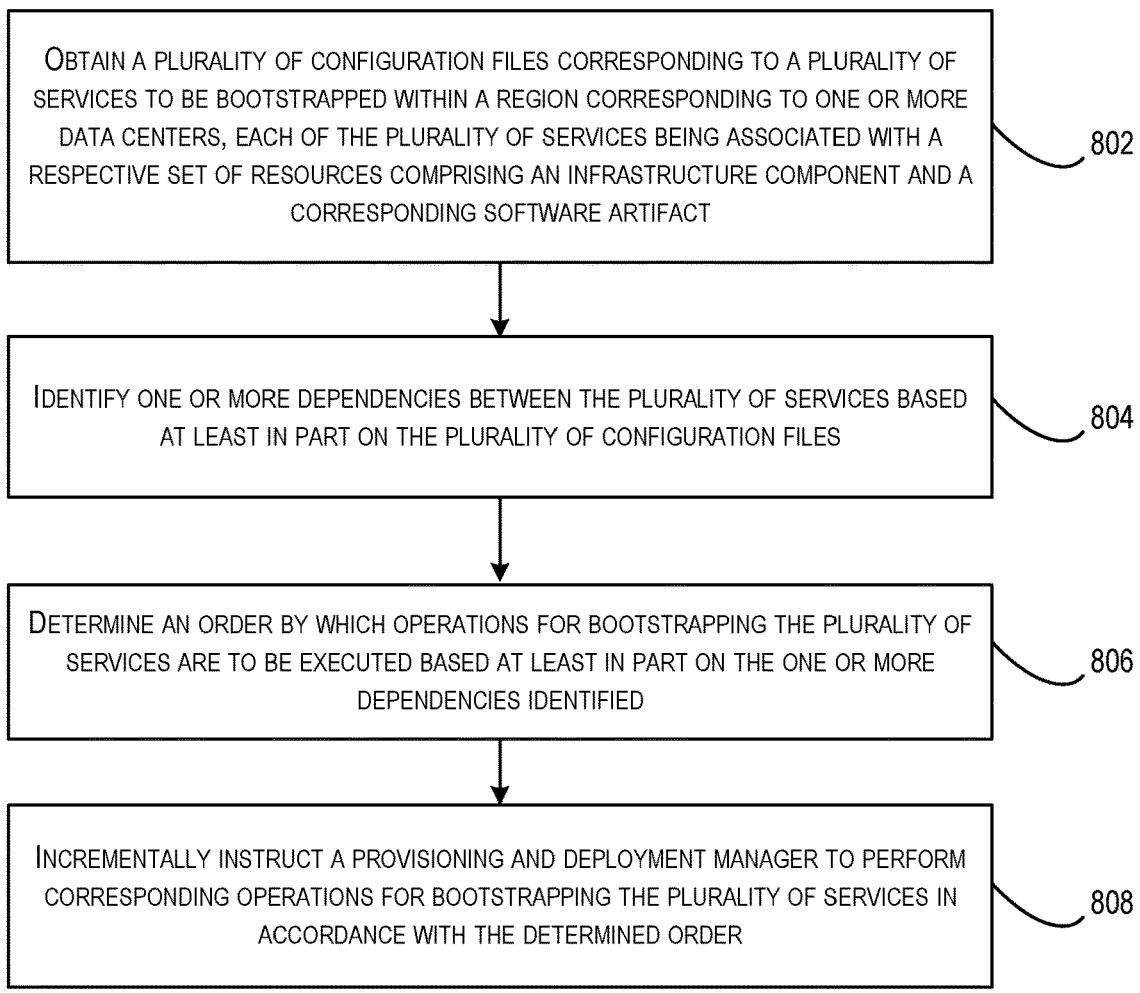
FIG. 8 illustrates an example method for performing a region build (e.g., modifying a region through incrementally performing bootstrapping operations), according to at least one embodiment.

FIG. 8 illustrates an example method 800 for performing a region build (e.g., modifying a region through incrementally performing bootstrapping operations), according to at least one embodiment. The method 800 may be performed by one or more components of the Cloud Infrastructure Orchestration Service 102 of FIG. 1 (e.g., an orchestration service such as Multi-Flock Orchestrator 106 of FIG. 1). A computer-readable storage medium comprising computer-readable instructions that, upon execution by one or more processors of a computing device, cause the computing device to perform the method 800. The method 800 may performed in any suitable order or in parallel. It should be appreciated that the method 800 may include a greater number or a lesser number of steps than that depicted in FIG. 8.

The method 800 may begin at 802, where a plurality of configuration files corresponding to a plurality of services to be bootstrapped within a region corresponding to one or more data centers may be obtained. In some embodiments, each of the plurality of services may be associated with a respective set of resources comprising an infrastructure component and a corresponding software artifact.

At 804, one or more dependencies between the plurality of services may be identified based at least in part on the plurality of configuration files. As described above, a static analysis may be performed which can include parsing the configuration files to identify one or more dependences (e.g., direct references to variables and/or identifiers associated with other services, indirect references to variables and/or identifiers associated with other services, etc.).

At 806, an order by which operations for bootstrapping the plurality of services are to be executed may be determined based at least in part on the one or more dependencies identified. As described above, a record, data structure (e.g., a directed graph such as Build Dependency Graph 314 of FIG. 5) may be generated to maintain knowledge of these dependencies.

At 808, a provisioning and deployment manager (e.g., CIOS Central 108 of FIG. 1) may be incrementally instructed to perform corresponding operations for bootstrapping the plurality of services in accordance with determined order. In some embodiments, such as when a data structure is used to manage dependencies, the data structure can be traversed in a similar manner as described above in connection with FIG. 7 to incrementally drive bootstrapping operations of any suitable number of services corresponding to a region build.

Figure 9:
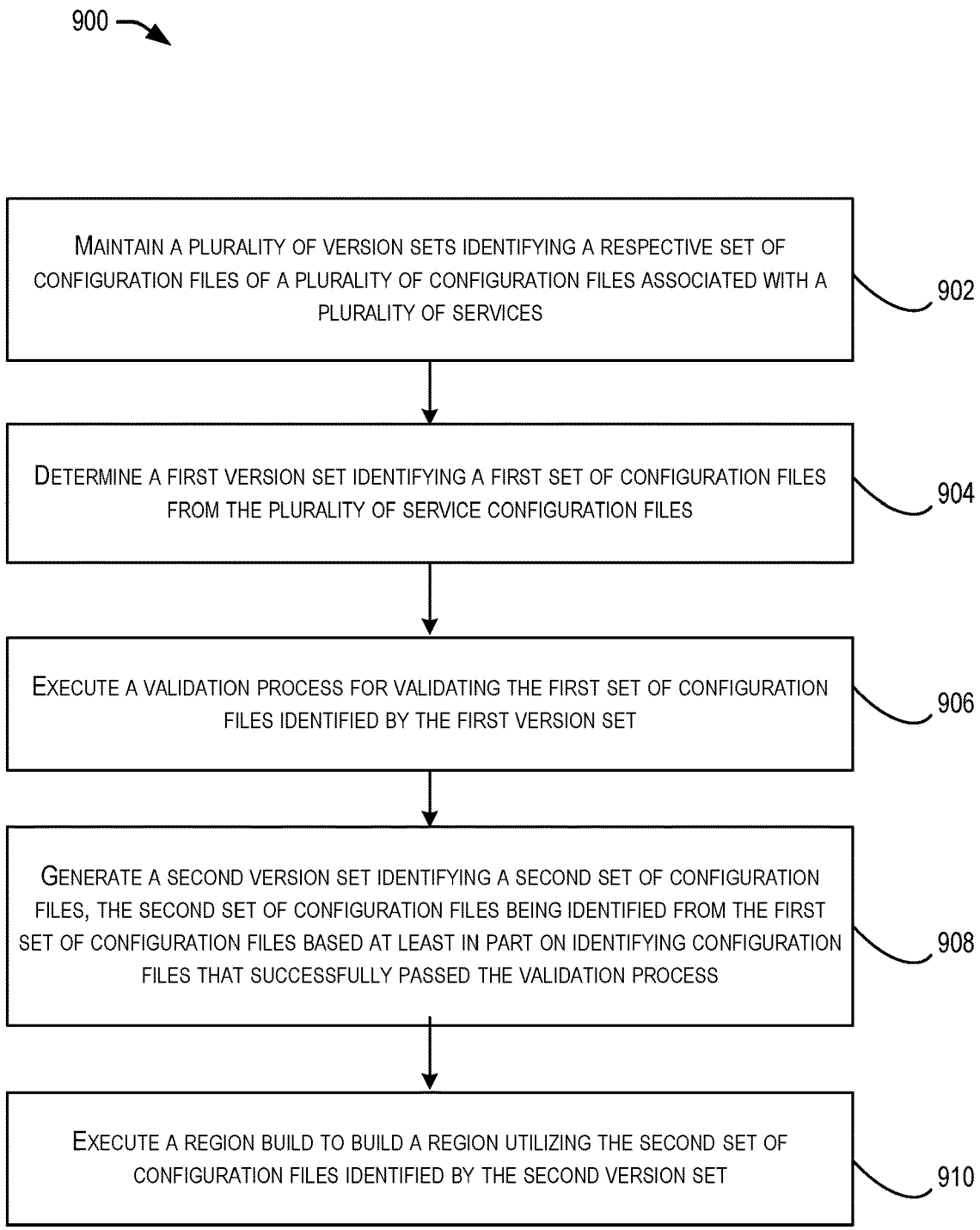
FIG. 9 illustrates an example method for utilizing a version set to perform a region build, according to at least one embodiment.

FIG. 9 illustrates an example method 900 for utilizing a version set to perform a region build (e.g., bootstrapping resources to one or more data centers within a region), according to at least one embodiment. The method 900 may be performed by one or more components of the Cloud Infrastructure Orchestration Service 102 of FIG. 1 (e.g., an orchestration service such as Multi-Flock Orchestrator 106 of FIG. 1). A computer-readable storage medium comprising computer-readable instructions that, upon execution by one or more processors of a computing device, cause the computing device to perform the method 900. The method 900 may performed in any suitable order or in parallel. It should be appreciated that the method 900 may include a greater number or a lesser number of steps than that depicted in FIG. 900.

The method 900 may begin at 902, where a plurality of version sets (e.g., the version sets of FIG. 6) may be maintained. Each of the plurality of version sets identifying a respective set of configuration files of a plurality of configuration files associated with a plurality of services.

At 904, a first version set (e.g., a nightly version set) may be determined. The first version set may identify a first set of configuration files from the plurality of configuration files.

At 906, a validation process for validating the first set of configuration files identified by the first version set may be executed.

At 908, a second version set (e.g., a golden version set) identifying a second set of configuration files may be generated. In some embodiments, the second set of configuration files being identified from the first set of configuration files based at least in part on identifying flock configuration files that successfully passed the validation process.

At 910, a region build may be executed utilizing the second set of configuration files identified by the second version set.

Example Cloud Service Infrastructure Architecture

As noted above, infrastructure as a service (IaaS) is one particular type of cloud-computing. IaaS can be configured to provide virtualized computing resources over a public network (e.g., the Internet). In an IaaS model, a cloud-computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud-computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 10:
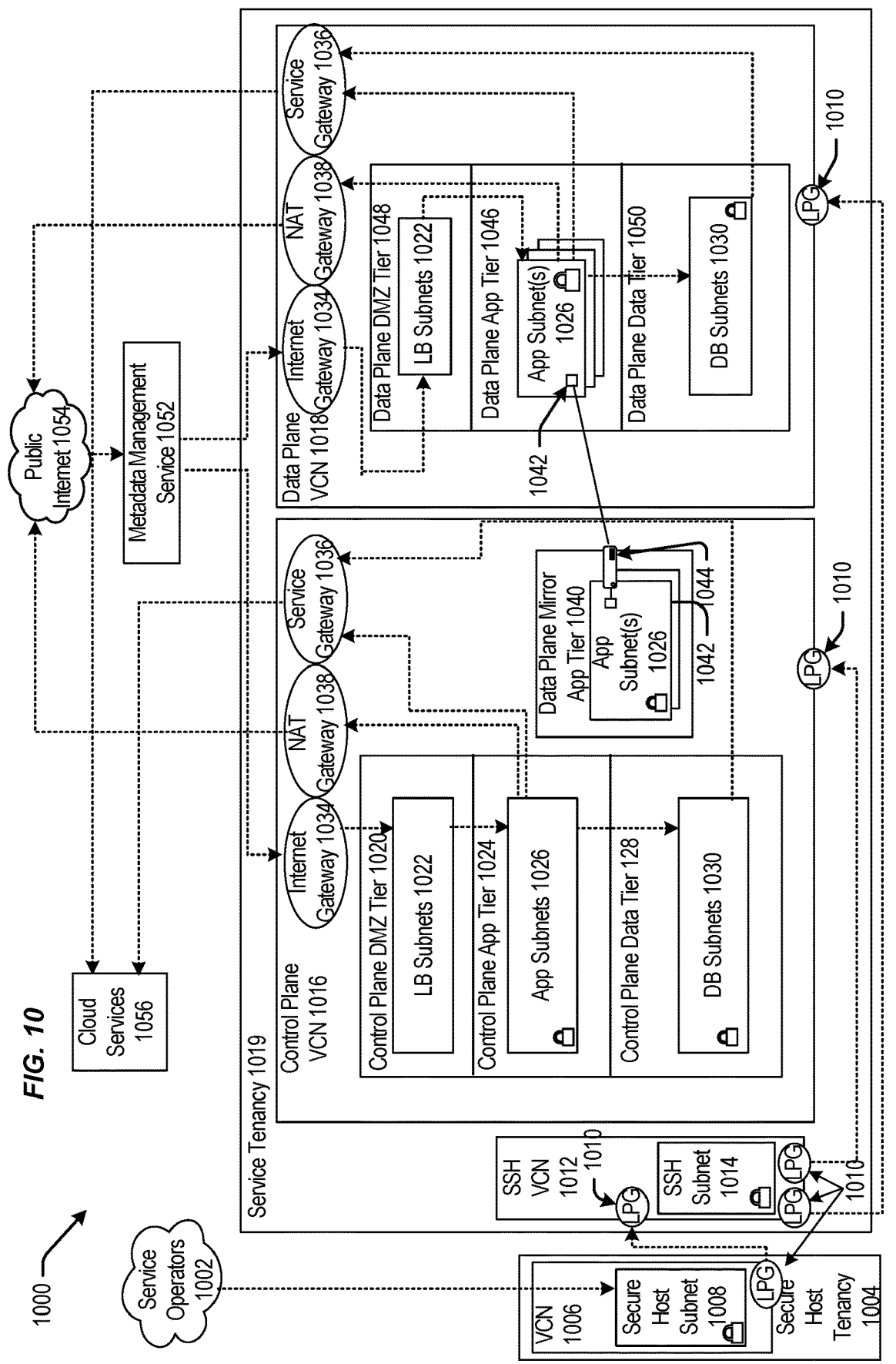
FIG. 10 is a block diagram illustrating one pattern for implementing a cloud infrastructure as a service system, according to at least one embodiment.

FIG. 10 is a block diagram 1000 illustrating an example pattern of an IaaS architecture, according to at least one embodiment. Service operators 1002 can be communicatively coupled to a secure host tenancy 1004 that can include a virtual cloud network (VCN) 1006 and a secure host subnet 1008. In some examples, the service operators 1002 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1006 and/or the Internet.

The VCN 1006 can include a local peering gateway (LPG) 1010 that can be communicatively coupled to a secure shell (SSH) VCN 1012 via an LPG 1010 contained in the SSH VCN 1012. The SSH VCN 1012 can include an SSH subnet 1014, and the SSH VCN 1012 can be communicatively coupled to a control plane VCN 1016 via the LPG 1010 contained in the control plane VCN 1016. Also, the SSH VCN 1012 can be communicatively coupled to a data plane VCN 1018 via an LPG 1010. The control plane VCN 1016 and the data plane VCN 1018 can be contained in a service tenancy 1019 that can be owned and/or operated by the IaaS provider.

The control plane VCN 1016 can include a control plane demilitarized zone (DMZ) tier 1020 that acts as a perimeter network (e.g., portions of a corporate network between the corporate intranet and external networks). The DMZ-based servers may have restricted responsibilities and help keep breaches contained. Additionally, the DMZ tier 1020 can include one or more load balancer (LB) subnet(s) 1022, a control plane app tier 1024 that can include app subnet(s) 1026, a control plane data tier 1028 that can include database (DB) subnet(s) 1030 (e.g., frontend DB subnet(s) and/or backend DB subnet(s)). The LB subnet(s) 1022 contained in the control plane DMZ tier 1020 can be communicatively coupled to the app subnet(s) 1026 contained in the control plane app tier 1024 and an Internet gateway 1034 that can be contained in the control plane VCN 1016, and the app subnet(s) 1026 can be communicatively coupled to the DB subnet(s) 1030 contained in the control plane data tier 1028 and a service gateway 1036 and a network address translation (NAT) gateway 1038. The control plane VCN 1016 can include the service gateway 1036 and the NAT gateway 1038.

The control plane VCN 1016 can include a data plane mirror app tier 1040 that can include app subnet(s) 1026. The app subnet(s) 1026 contained in the data plane mirror app tier 1040 can include a virtual network interface controller (VNIC) 1042 that can execute a compute instance 1044. The compute instance 1044 can communicatively couple the app subnet(s) 1026 of the data plane mirror app tier 1040 to app subnet(s) 1026 that can be contained in a data plane app tier 1046.

The data plane VCN 1018 can include the data plane app tier 1046, a data plane DMZ tier 1048, and a data plane data tier 1050. The data plane DMZ tier 1048 can include LB subnet(s) 1022 that can be communicatively coupled to the app subnet(s) 1026 of the data plane app tier 1046 and the Internet gateway 1034 of the data plane VCN 1018. The app subnet(s) 1026 can be communicatively coupled to the service gateway 1036 of the data plane VCN 1018 and the NAT gateway 1038 of the data plane VCN 1018. The data plane data tier 1050 can also include the DB subnet(s) 1030 that can be communicatively coupled to the app subnet(s) 1026 of the data plane app tier 1046.

The Internet gateway 1034 of the control plane VCN 1016 and of the data plane VCN 1018 can be communicatively coupled to a metadata management service 1052 that can be communicatively coupled to public Internet 1054. Public Internet 1054 can be communicatively coupled to the NAT gateway 1038 of the control plane VCN 1016 and of the data plane VCN 1018. The service gateway 1036 of the control plane VCN 1016 and of the data plane VCN 1018 can be communicatively couple to cloud services 1056.

In some examples, the service gateway 1036 of the control plane VCN 1016 or of the data plane VCN 1018 can make application programming interface (API) calls to cloud services 1056 without going through public Internet 1054. The API calls to cloud services 1056 from the service gateway 1036 can be one-way: the service gateway 1036 can make API calls to cloud services 1056, and cloud services 1056 can send requested data to the service gateway 1036. But, cloud services 1056 may not initiate API calls to the service gateway 1036.

In some examples, the secure host tenancy 1004 can be directly connected to the service tenancy 1019, which may be otherwise isolated. The secure host subnet 1008 can communicate with the SSH subnet 1014 through an LPG 1010 that may enable two-way communication over an otherwise isolated system. Connecting the secure host subnet 1008 to the SSH subnet 1014 may give the secure host subnet 1008 access to other entities within the service tenancy 1019.

The control plane VCN 1016 may allow users of the service tenancy 1019 to set up or otherwise provision desired resources. Desired resources provisioned in the control plane VCN 1016 may be deployed or otherwise used in the data plane VCN 1018. In some examples, the control plane VCN 1016 can be isolated from the data plane VCN 1018, and the data plane mirror app tier 1040 of the control plane VCN 1016 can communicate with the data plane app tier 1046 of the data plane VCN 1018 via VNICs 1042 that can be contained in the data plane mirror app tier 1040 and the data plane app tier 1046.

In some examples, users of the system, or customers, can make requests, for example create, read, update, or delete (CRUD) operations, through public Internet 1054 that can communicate the requests to the metadata management service 1052. The metadata management service 1052 can communicate the request to the control plane VCN 1016 through the Internet gateway 1034. The request can be received by the LB subnet(s) 1022 contained in the control plane DMZ tier 1020. The LB subnet(s) 1022 may determine that the request is valid, and in response to this determination, the LB subnet(s) 1022 can transmit the request to app subnet(s) 1026 contained in the control plane app tier 1024. If the request is validated and requires a call to public Internet 1054, the call to public Internet 1054 may be transmitted to the NAT gateway 1038 that can make the call to public Internet 1054. Metadata that may be desired to be stored by the request can be stored in the DB subnet(s) 1030.

In some examples, the data plane mirror app tier 1040 can facilitate direct communication between the control plane VCN 1016 and the data plane VCN 1018. For example, changes, updates, or other suitable modifications to configuration may be desired to be applied to the resources contained in the data plane VCN 1018. Via a VNIC 1042, the control plane VCN 1016 can directly communicate with, and can thereby execute the changes, updates, or other suitable modifications to configuration to, resources contained in the data plane VCN 1018.

In some embodiments, the control plane VCN 1016 and the data plane VCN 1018 can be contained in the service tenancy 1019. In this case, the user, or the customer, of the system may not own or operate either the control plane VCN 1016 or the data plane VCN 1018. Instead, the IaaS provider may own or operate the control plane VCN 1016 and the data plane VCN 1018, both of which may be contained in the service tenancy 1019. This embodiment can enable isolation of networks that may prevent users or customers from interacting with other users', or other customers', resources. Also, this embodiment may allow users or customers of the system to store databases privately without needing to rely on public Internet 1054, which may not have a desired level of threat prevention, for storage.

In other embodiments, the LB subnet(s) 1022 contained in the control plane VCN 1016 can be configured to receive a signal from the service gateway 1036. In this embodiment, the control plane VCN 1016 and the data plane VCN 1018 may be configured to be called by a customer of the IaaS provider without calling public Internet 1054. Customers of the IaaS provider may desire this embodiment since database(s) that the customers use may be controlled by the IaaS provider and may be stored on the service tenancy 1019, which may be isolated from public Internet 1054.

Figure 11:
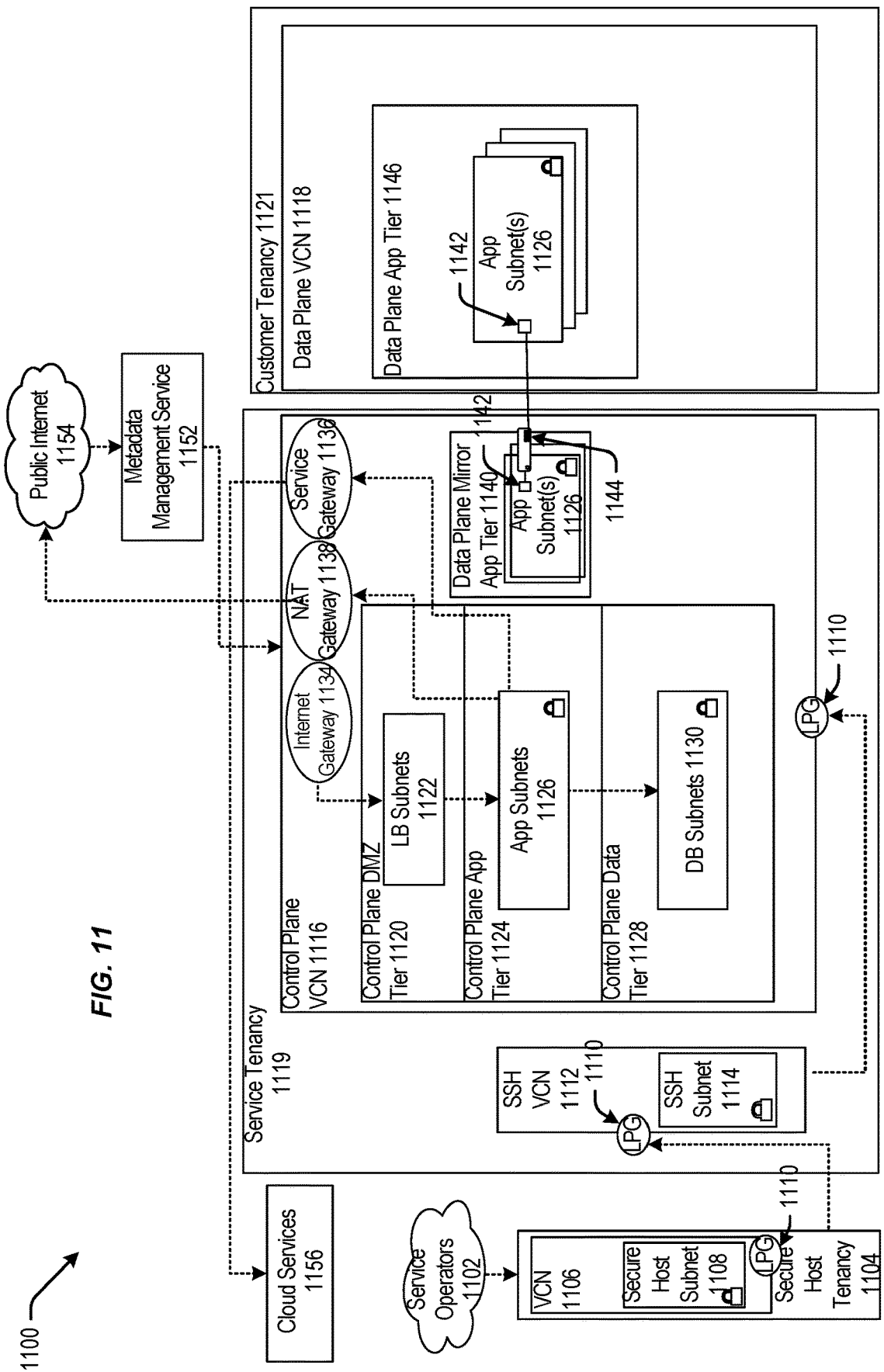
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 1002 of FIG. 10) can be communicatively coupled to a secure host tenancy 1104 (e.g., the secure host tenancy 1004 of FIG. 10) that can include a virtual cloud network (VCN) 1106 (e.g., the VCN 1006 of FIG. 10) and a secure host subnet 1108 (e.g., the secure host subnet 1008 of FIG. 10). The VCN 1106 can include a local peering gateway (LPG) 1110 (e.g., the LPG 1010 of FIG. 10) that can be communicatively coupled to a secure shell (SSH) VCN 1112 (e.g., the SSH VCN 1012 of FIG. 10) via an LPG 1010 contained in the SSH VCN 1112. The SSH VCN 1112 can include an SSH subnet 1114 (e.g., the SSH subnet 1014 of FIG. 10), and the SSH VCN 1112 can be communicatively coupled to a control plane VCN 1116 (e.g., the control plane VCN 1016 of FIG. 10) via an LPG 1110 contained in the control plane VCN 1116. The control plane VCN 1116 can be contained in a service tenancy 1119 (e.g., the service tenancy 1019 of FIG. 10), and the data plane VCN 1118 (e.g., the data plane VCN 1018 of FIG. 10) can be contained in a customer tenancy 1121 that may be owned or operated by users, or customers, of the system.

The control plane VCN 1116 can include a control plane DMZ tier 1120 (e.g., the control plane DMZ tier 1020 of FIG. 10) that can include LB subnet(s) 1122 (e.g., LB subnet(s) 1022 of FIG. 10), a control plane app tier 1124 (e.g., the control plane app tier 1024 of FIG. 10) that can include app subnet(s) 1126 (e.g., app subnet(s) 1026 of FIG. 10), a control plane data tier 1128 (e.g., the control plane data tier 1028 of FIG. 10) that can include database (DB) subnet(s) 1130 (e.g., similar to DB subnet(s) 1030 of FIG. 10). The LB subnet(s) 1122 contained in the control plane DMZ tier 1120 can be communicatively coupled to the app subnet(s) 1126 contained in the control plane app tier 1124 and an Internet gateway 1134 (e.g., the Internet gateway 1034 of FIG. 10) that can be contained in the control plane VCN 1116, and the app subnet(s) 1126 can be communicatively coupled to the DB subnet(s) 1130 contained in the control plane data tier 1128 and a service gateway 1136 (e.g., the service gateway 1036 of FIG. 10) and a network address translation (NAT) gateway 1138 (e.g., the NAT gateway 1038 of FIG. 10). The control plane VCN 1116 can include the service gateway 1136 and the NAT gateway 1138.

The control plane VCN 1116 can include a data plane mirror app tier 1140 (e.g., the data plane mirror app tier 1040 of FIG. 10) that can include app subnet(s) 1126. The app subnet(s) 1126 contained in the data plane mirror app tier 1140 can include a virtual network interface controller (VNIC) 1142 (e.g., the VNIC of 1042) that can execute a compute instance 1144 (e.g., similar to the compute instance 1044 of FIG. 10). The compute instance 1144 can facilitate communication between the app subnet(s) 1126 of the data plane mirror app tier 1140 and the app subnet(s) 1126 that can be contained in a data plane app tier 1146 (e.g., the data plane app tier 1046 of FIG. 10) via the VNIC 1142 contained in the data plane mirror app tier 1140 and the VNIC 1142 contained in the data plane app tier 1146.

The Internet gateway 1134 contained in the control plane VCN 1116 can be communicatively coupled to a metadata management service 1152 (e.g., the metadata management service 1052 of FIG. 10) that can be communicatively coupled to public Internet 1154 (e.g., public Internet 1054 of FIG. 10). Public Internet 1154 can be communicatively coupled to the NAT gateway 1138 contained in the control plane VCN 1116. The service gateway 1136 contained in the control plane VCN 1116 can be communicatively couple to cloud services 1156 (e.g., cloud services 1056 of FIG. 10).

In some examples, the data plane VCN 1118 can be contained in the customer tenancy 1121. In this case, the IaaS provider may provide the control plane VCN 1116 for each customer, and the IaaS provider may, for each customer, set up a unique compute instance 1144 that is contained in the service tenancy 1119. Each compute instance 1144 may allow communication between the control plane VCN 1116, contained in the service tenancy 1119, and the data plane VCN 1118 that is contained in the customer tenancy 1121. The compute instance 1144 may allow resources, that are provisioned in the control plane VCN 1116 that is contained in the service tenancy 1119, to be deployed or otherwise used in the data plane VCN 1118 that is contained in the customer tenancy 1121.

In other examples, the customer of the IaaS provider may have databases that live in the customer tenancy 1121. In this example, the control plane VCN 1116 can include the data plane mirror app tier 1140 that can include app subnet(s) 1126. The data plane mirror app tier 1140 can reside in the data plane VCN 1118, but the data plane mirror app tier 1140 may not live in the data plane VCN 1118. That is, the data plane mirror app tier 1140 may have access to the customer tenancy 1121, but the data plane mirror app tier 1140 may not exist in the data plane VCN 1118 or be owned or operated by the customer of the IaaS provider. The data plane mirror app tier 1140 may be configured to make calls to the data plane VCN 1118 but may not be configured to make calls to any entity contained in the control plane VCN 1116. The customer may desire to deploy or otherwise use resources in the data plane VCN 1118 that are provisioned in the control plane VCN 1116, and the data plane mirror app tier 1140 can facilitate the desired deployment, or other usage of resources, of the customer.

In some embodiments, the customer of the IaaS provider can apply filters to the data plane VCN 1118. In this embodiment, the customer can determine what the data plane VCN 1118 can access, and the customer may restrict access to public Internet 1154 from the data plane VCN 1118. The IaaS provider may not be able to apply filters or otherwise control access of the data plane VCN 1118 to any outside networks or databases. Applying filters and controls by the customer onto the data plane VCN 1118, contained in the customer tenancy 1121, can help isolate the data plane VCN 1118 from other customers and from public Internet 1154.

In some embodiments, cloud services 1156 can be called by the service gateway 1136 to access services that may not exist on public Internet 1154, on the control plane VCN 1116, or on the data plane VCN 1118. The connection between cloud services 1156 and the control plane VCN 1116 or the data plane VCN 1118 may not be live or continuous. Cloud services 1156 may exist on a different network owned or operated by the IaaS provider. Cloud services 1156 may be configured to receive calls from the service gateway 1136 and may be configured to not receive calls from public Internet 1154. Some cloud services 1156 may be isolated from other cloud services 1156, and the control plane VCN 1116 may be isolated from cloud services 1156 that may not be in the same region as the control plane VCN 1116. For example, the control plane VCN 1116 may be located in "Region 1," and cloud service "Deployment 10," may be located in Region 1 and in "Region 2." If a call to Deployment 10 is made by the service gateway 1136 contained in the control plane VCN 1116 located in Region 1, the call may be transmitted to Deployment 10 in Region 1. In this example, the control plane VCN 1116, or Deployment 10 in Region 1, may not be communicatively coupled to, or otherwise in communication with, Deployment 10 in Region 2.

Figure 12:
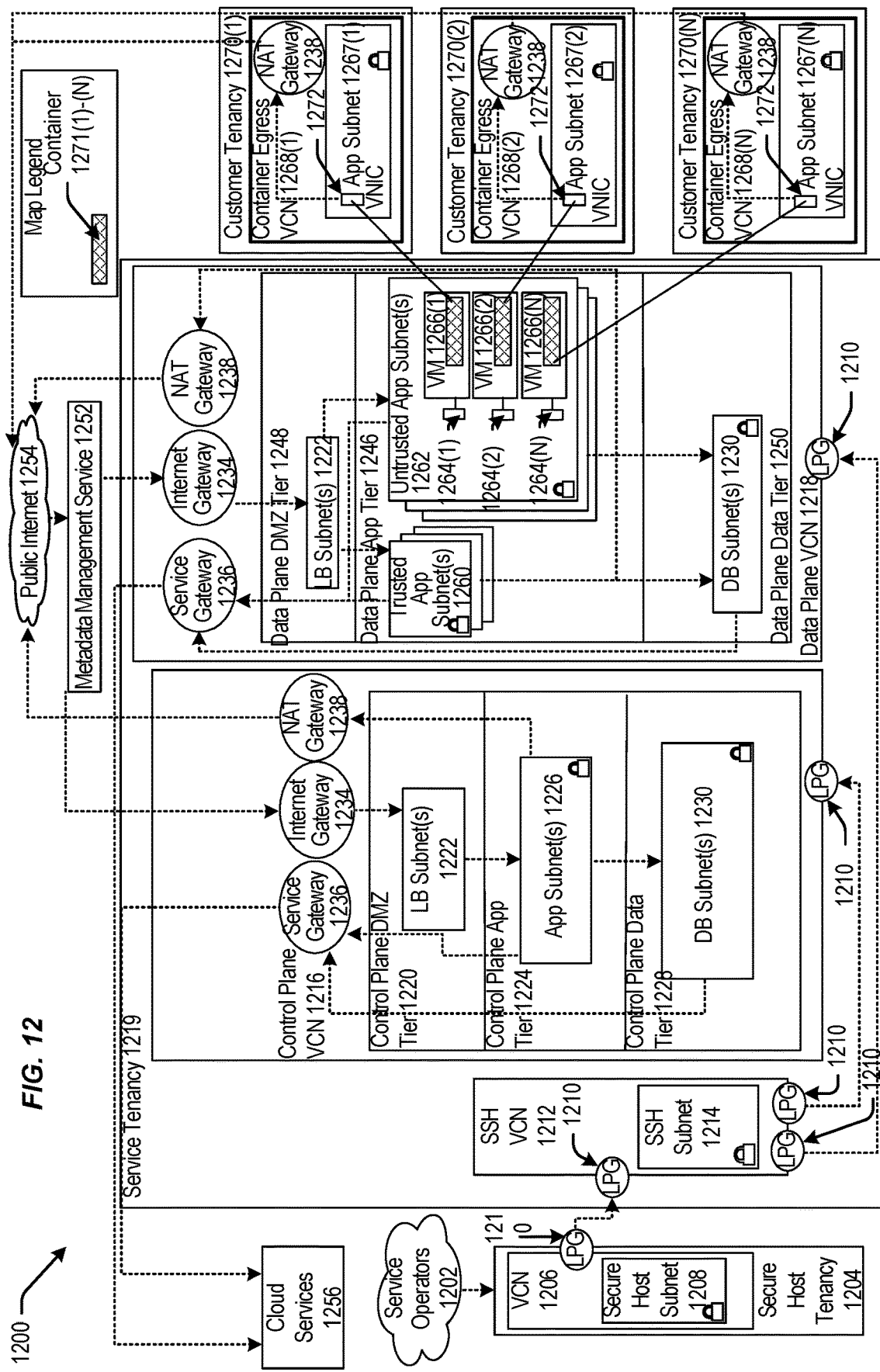
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 1002 of FIG. 10) can be communicatively coupled to a secure host tenancy 1204 (e.g., the secure host tenancy 1004 of FIG. 10) that can include a virtual cloud network (VCN) 1206 (e.g., the VCN 1006 of FIG. 10) and a secure host subnet 1208 (e.g., the secure host subnet 1008 of FIG. 10). The VCN 1206 can include an LPG 1210 (e.g., the LPG 1010 of FIG. 10) that can be communicatively coupled to an SSH VCN 1212 (e.g., the SSH VCN 1012 of FIG. 10) via an LPG 1210 contained in the SSH VCN 1212. The SSH VCN 1212 can include an SSH subnet 1214 (e.g., the SSH subnet 1014 of FIG. 10), and the SSH VCN 1212 can be communicatively coupled to a control plane VCN 1216 (e.g., the control plane VCN 1016 of FIG. 10) via an LPG 1210 contained in the control plane VCN 1216 and to a data plane VCN 1218 (e.g., the data plane 1018 of FIG. 10) via an LPG 1210 contained in the data plane VCN 1218. The control plane VCN 1216 and the data plane VCN 1218 can be contained in a service tenancy 1219 (e.g., the service tenancy 1019 of FIG. 10).

The control plane VCN 1216 can include a control plane DMZ tier 1220 (e.g., the control plane DMZ tier 1020 of FIG. 10) that can include load balancer (LB) subnet(s) 1222 (e.g., LB subnet(s) 1022 of FIG. 10), a control plane app tier 1224 (e.g., the control plane app tier 1024 of FIG. 10) that can include app subnet(s) 1226 (e.g., similar to app subnet(s) 1026 of FIG. 10), a control plane data tier 1228 (e.g., the control plane data tier 1028 of FIG. 10) that can include DB subnet(s) 1230. The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 1034 of FIG. 10) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 10) and a network address translation (NAT) gateway 1238 (e.g., the NAT gateway 1038 of FIG. 10). The control plane VCN 1216 can include the service gateway 1236 and the NAT gateway 1238.

The data plane VCN 1218 can include a data plane app tier 1246 (e.g., the data plane app tier 1046 of FIG. 10), a data plane DMZ tier 1248 (e.g., the data plane DMZ tier 1048 of FIG. 10), and a data plane data tier 1250 (e.g., the data plane data tier 1050 of FIG. 10). The data plane DMZ tier 1248 can include LB subnet(s) 1222 that can be communicatively coupled to trusted app subnet(s) 1260 and untrusted app subnet(s) 1262 of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include one or more primary VNICs 1264(1)-(N) that can be communicatively coupled to tenant virtual machines (VMs) 1266(1)-(N). Each tenant VM 1266(1)-(N) can be communicatively coupled to a respective app subnet 1267(1)-(N) that can be contained in respective container egress VCNs 1268(1)-(N) that can be contained in respective customer tenancies 1270(1)-(N). Respective secondary VNICs 1272(1)-(N) can facilitate communication between the untrusted app subnet(s) 1262 contained in the data plane VCN 1218 and the app subnet contained in the container egress VCNs 1268(1)-(N). Each container egress VCNs 1268(1)-(N) can include a NAT gateway 1238 that can be communicatively coupled to public Internet 1254 (e.g., public Internet 1054 of FIG. 10).

The Internet gateway 1234 contained in the control plane VCN 1216 and contained in the data plane VCN 1218 can be communicatively coupled to a metadata management service 1252 (e.g., the metadata management system 1052 of FIG. 10) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some embodiments, the data plane VCN 1218 can be integrated with customer tenancies 1270. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1246. Code to run the function may be executed in the VMs 1266(1)-(N), and the code may not be configured to run anywhere else on the data plane VCN 1218. Each VM 1266(1)-(N) may be connected to one customer tenancy 1270. Respective containers 1271(1)-(N) contained in the VMs 1266(1)-(N) may be configured to run the code. In this case, there can be a dual isolation (e.g., the containers 1271(1)-(N) running code, where the containers 1271(1)-(N) may be contained in at least the VM 1266(1)-(N) that are contained in the untrusted app subnet(s) 1262), which may help prevent incorrect or otherwise undesirable code from damaging the network of the IaaS provider or from damaging a network of a different customer. The containers 1271(1)-(N) may be communicatively coupled to the customer tenancy 1270 and may be configured to transmit or receive data from the customer tenancy 1270. The containers 1271(1)-(N) may not be configured to transmit or receive data from any other entity in the data plane VCN 1218. Upon completion of running the code, the IaaS provider may kill or otherwise dispose of the containers 1271(1)-(N).

In some embodiments, the trusted app subnet(s) 1260 may run code that may be owned or operated by the IaaS provider. In this embodiment, the trusted app subnet(s) 1260 may be communicatively coupled to the DB subnet(s) 1230 and be configured to execute CRUD operations in the DB subnet(s) 1230. The untrusted app subnet(s) 1262 may be communicatively coupled to the DB subnet(s) 1230, but in this embodiment, the untrusted app subnet(s) may be configured to execute read operations in the DB subnet(s) 1230. The containers 1271(1)-(N) that can be contained in the VM 1266(1)-(N) of each customer and that may run code from the customer may not be communicatively coupled with the DB subnet(s) 1230.

In other embodiments, the control plane VCN 1216 and the data plane VCN 1218 may not be directly communicatively coupled. In this embodiment, there may be no direct communication between the control plane VCN 1216 and the data plane VCN 1218. However, communication can occur indirectly through at least one method. An LPG 1210 may be established by the IaaS provider that can facilitate communication between the control plane VCN 1216 and the data plane VCN 1218. In another example, the control plane VCN 1216 or the data plane VCN 1218 can make a call to cloud services 1256 via the service gateway 1236. For example, a call to cloud services 1256 from the control plane VCN 1216 can include a request for a service that can communicate with the data plane VCN 1218.

Figure 13:
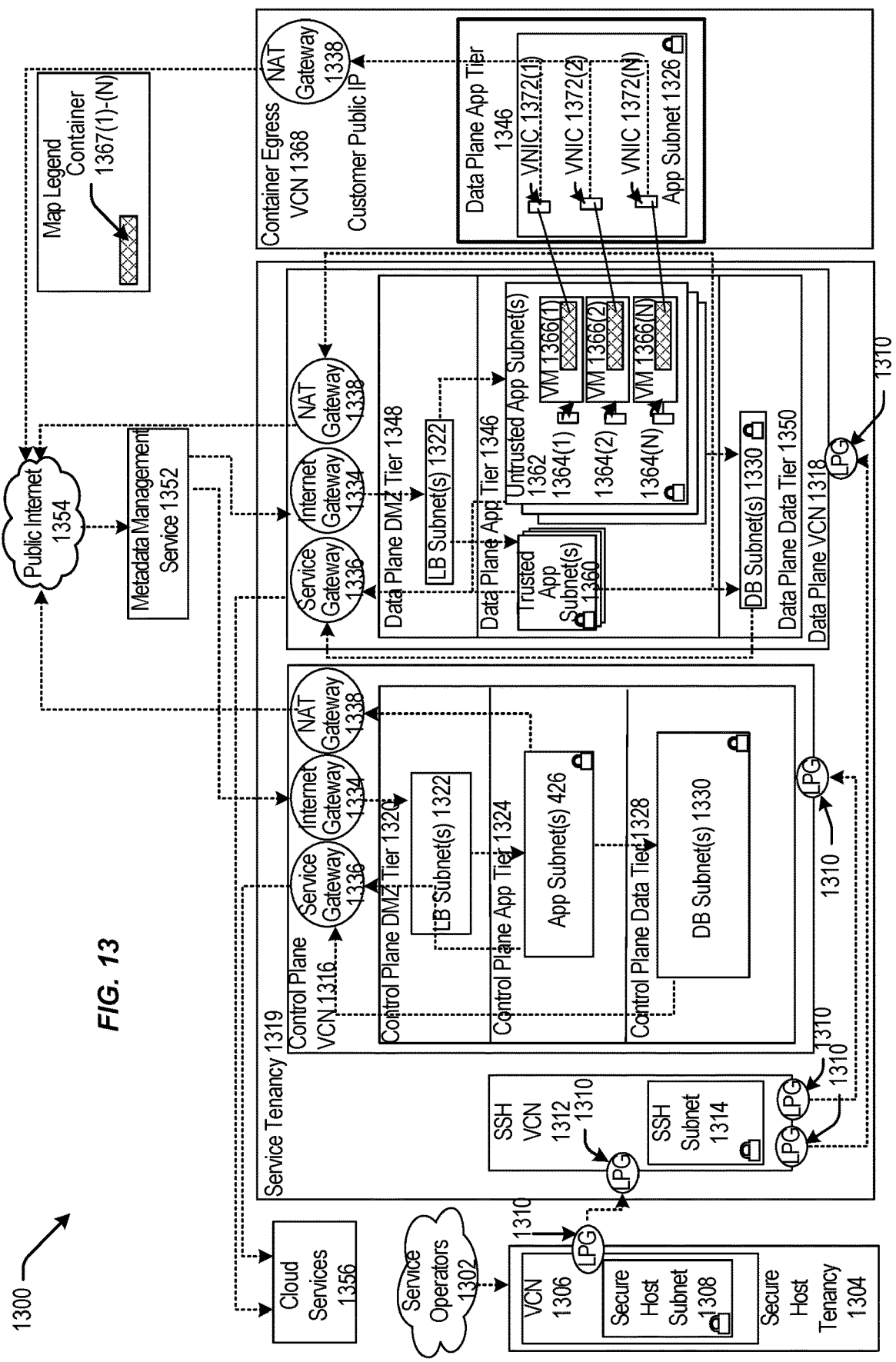
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g., service operators 1002 of FIG. 10) can be communicatively coupled to a secure host tenancy 1304 (e.g., the secure host tenancy 1004 of FIG. 10) that can include a virtual cloud network (VCN) 1306 (e.g., the VCN 1006 of FIG. 10) and a secure host subnet 1308 (e.g., the secure host subnet 1008 of FIG. 10). The VCN 1306 can include an LPG 1310 (e.g., the LPG 1010 of FIG. 10) that can be communicatively coupled to an SSH VCN 1312 (e.g., the SSH VCN 1012 of FIG. 10) via an LPG 1310 contained in the SSH VCN 1312. The SSH VCN 1312 can include an SSH subnet 1314 (e.g., the SSH subnet 1014 of FIG. 10), and the SSH VCN 1312 can be communicatively coupled to a control plane VCN 1316 (e.g., the control plane VCN 1016 of FIG. 10) via an LPG 1310 contained in the control plane VCN 1316 and to a data plane VCN 1318 (e.g., the data plane 1018 of FIG. 10) via an LPG 1310 contained in the data plane VCN 1318. The control plane VCN 1316 and the data plane VCN 1318 can be contained in a service tenancy 1319 (e.g., the service tenancy 1019 of FIG. 10).

The control plane VCN 1316 can include a control plane DMZ tier 1320 (e.g., the control plane DMZ tier 1020 of FIG. 10) that can include LB subnet(s) 1322 (e.g., LB subnet(s) 1022 of FIG. 10), a control plane app tier 1324 (e.g., the control plane app tier 1024 of FIG. 10) that can include app subnet(s) 1326 (e.g., app subnet(s) 1026 of FIG. 10), a control plane data tier 1328 (e.g., the control plane data tier 1028 of FIG. 10) that can include DB subnet(s) 1330 (e.g., DB subnet(s) 1230 of FIG. 12). The LB subnet(s) 1322 contained in the control plane DMZ tier 1320 can be communicatively coupled to the app subnet(s) 1326 contained in the control plane app tier 1324 and to an Internet gateway 1334 (e.g., the Internet gateway 1034 of FIG. 10) that can be contained in the control plane VCN 1316, and the app subnet(s) 1326 can be communicatively coupled to the DB subnet(s) 1330 contained in the control plane data tier 1328 and to a service gateway 1336 (e.g., the service gateway of FIG. 10) and a network address translation (NAT) gateway 1338 (e.g., the NAT gateway 1038 of FIG. 10). The control plane VCN 1316 can include the service gateway 1336 and the NAT gateway 1338.

The data plane VCN 1318 can include a data plane app tier 1346 (e.g., the data plane app tier 1046 of FIG. 10), a data plane DMZ tier 1348 (e.g., the data plane DMZ tier 1048 of FIG. 10), and a data plane data tier 1350 (e.g., the data plane data tier 1050 of FIG. 10). The data plane DMZ tier 1348 can include LB subnet(s) 1322 that can be communicatively coupled to trusted app subnet(s) 1360 (e.g., trusted app subnet(s) 1260 of FIG. 12) and untrusted app subnet(s) 1362 (e.g., untrusted app subnet(s) 1262 of FIG. 12) of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include primary VNICs 1364(1)-(N) that can be communicatively coupled to tenant virtual machines (VMs) 1366(1)-(N) residing within the untrusted app subnet(s) 1362. Each tenant VM 1366(1)-(N) can run code in a respective container 1367(1)-(N), and be communicatively coupled to an app subnet 1326 that can be contained in a data plane app tier 1346 that can be contained in a container egress VCN 1368. Respective secondary VNICs 1372(1)-(N) can facilitate communication between the untrusted app subnet(s) 1362 contained in the data plane VCN 1318 and the app subnet contained in the container egress VCN 1368. The container egress VCN can include a NAT gateway 1338 that can be communicatively coupled to public Internet 1354 (e.g., public Internet 1054 of FIG. 10).

The Internet gateway 1334 contained in the control plane VCN 1316 and contained in the data plane VCN 1318 can be communicatively coupled to a metadata management service 1352 (e.g., the metadata management system 1052 of FIG. 10) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some examples, the pattern illustrated by the architecture of block diagram 1300 of FIG. 13 may be considered an exception to the pattern illustrated by the architecture of block diagram 1200 of FIG. 12 and may be desirable for a customer of the IaaS provider if the IaaS provider cannot directly communicate with the customer (e.g., a disconnected region). The respective containers 1367(1)-(N) that are contained in the VMs 1366(1)-(N) for each customer can be accessed in real-time by the customer. The containers 1367(1)-(N) may be configured to make calls to respective secondary VNICs 1372(1)-(N) contained in app subnet(s) 1326 of the data plane app tier 1346 that can be contained in the container egress VCN 1368. The secondary VNICs 1372(1)-(N) can transmit the calls to the NAT gateway 1338 that may transmit the calls to public Internet 1354. In this example, the containers 1367(1)-(N) that can be accessed in real-time by the customer can be isolated from the control plane VCN 1316 and can be isolated from other entities contained in the data plane VCN 1318. The containers 1367(1)-(N) may also be isolated from resources from other customers.

In other examples, the customer can use the containers 1367(1)-(N) to call cloud services 1356. In this example, the customer may run code in the containers 1367(1)-(N) that requests a service from cloud services 1356. The containers 1367(1)-(N) can transmit this request to the secondary VNICs 1372(1)-(N) that can transmit the request to the NAT gateway that can transmit the request to public Internet 1354. Public Internet 1354 can transmit the request to LB subnet(s) 1322 contained in the control plane VCN 1316 via the Internet gateway 1334. In response to determining the request is valid, the LB subnet(s) can transmit the request to app subnet(s) 1326 that can transmit the request to cloud services 1356 via the service gateway 1336.

It should be appreciated that IaaS architectures 1000, 1100, 1200, 1300 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 14:
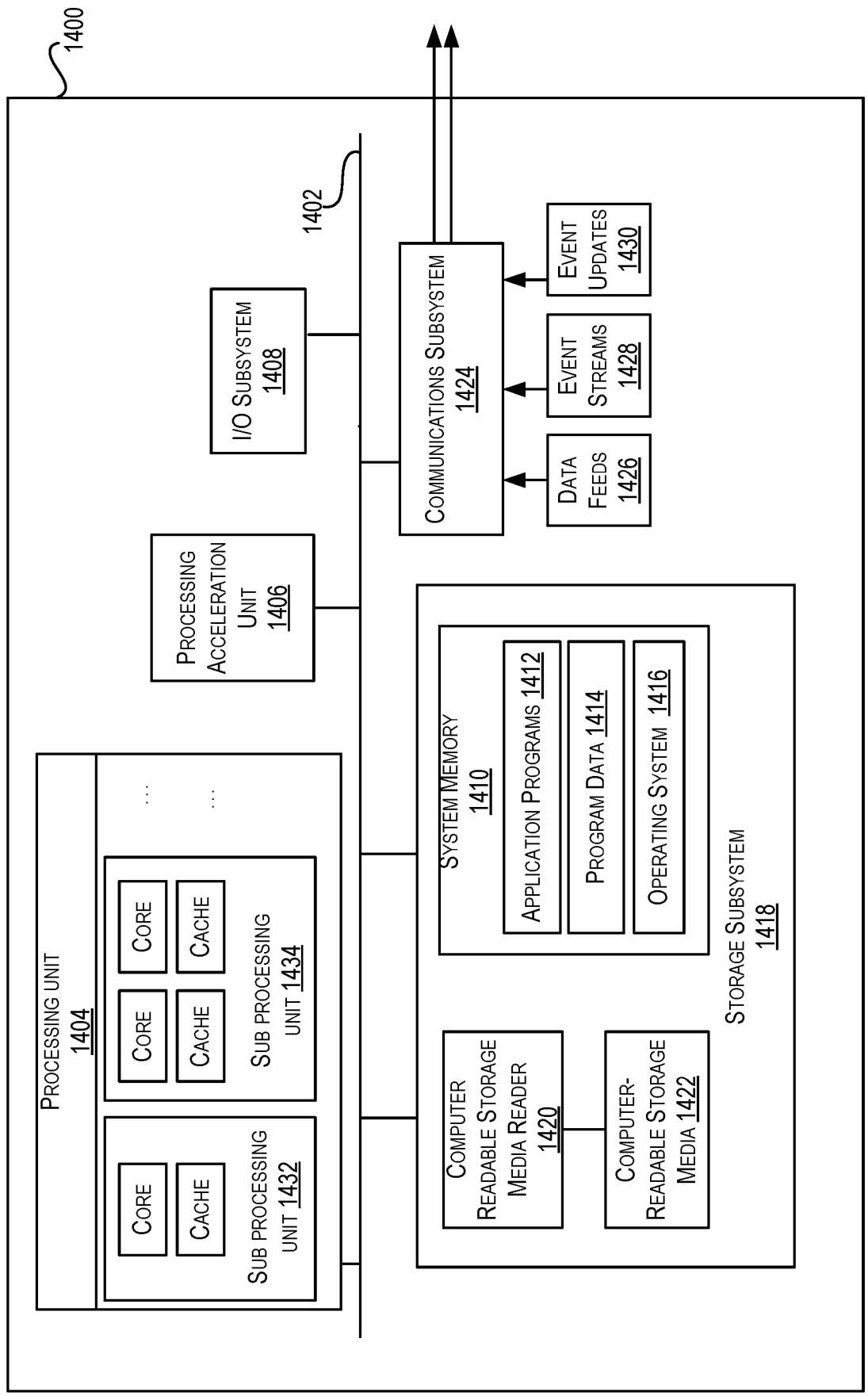
FIG. 14 is a block diagram illustrating an example computer system, according to at least one embodiment.

FIG. 14 illustrates an example computer system 1400, in which various embodiments may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1404 provide the functionality described above. Storage subsystem 1418 may also provide a repository for storing data used in accordance with the present disclosure.

As depicted in the example in FIG. 14, storage subsystem 1418 can include various components including a system memory 1410, computer-readable storage media 1422, and a computer readable storage media reader 1420. System memory 1410 may store program instructions that are loadable and executable by processing unit 1404. System memory 1410 may also store data that is used during the execution of the instructions and/or data that is generated during the execution of the program instructions. Various different kinds of programs may be loaded into system memory 1410 including but not limited to client applications, Web browsers, mid-tier applications, relational database management systems (RDBMS), virtual machines, containers, etc.

System memory 1410 may also store an operating system 1416. Examples of operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1400 executes one or more virtual machines, the virtual machines along with their guest operating systems (GOSs) may be loaded into system memory 1410 and executed by one or more processors or cores of processing unit 1404.

System memory 1410 can come in different configurations depending upon the type of computer system 1400. For example, system memory 1410 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1410 may include a basic input/output system (BIOS) containing basic routines that help to transfer information between elements within computer system 1400, such as during start-up.

Computer-readable storage media 1422 may represent remote, local, fixed, and/or removable storage devices plus storage media for temporarily and/or more permanently containing, storing, computer-readable information for use by computer system 1400 including instructions executable by processing unit 1404 of computer system 1400.

Computer-readable storage media 1422 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Machine-readable instructions executable by one or more processors or cores of processing unit 1404 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
maintaining, by an orchestration service of a cloud-computing environment, a plurality of version sets identifying a respective set of configuration files of a plurality of configuration files associated with building a plurality of services, the plurality of configuration files identifying a set of infrastructure components to be provisioned and a set of artifacts to be deployed as part of building each of the plurality of services;
determining, by the orchestration service, a first version set identifying a first set of configuration files from the plurality of configuration files;
identifying a first set of dependencies between the plurality of services based at least in part on parsing the first set of configuration files identified by the first version set;
executing, by the orchestration service, a validation process for validating the first set of configuration files identified by the first version set, the validation process comprising identifying, based at least in part on the first set of dependencies, a first order of a first set of provisioning and deployment operations that, when executed, provision first infrastructure resources and deploy first artifacts for each of the plurality of services according to the first order;
generating, by the orchestration service, a second version set identifying a second set of configuration files, the second set of configuration files being identified from the first set of configuration files based at least in part on identifying configuration files that successfully passed the validation process;
identifying a second set of dependencies between the plurality of services based at least in part on parsing the second set of configuration files identified by the second version set, the second set of dependencies being different from the first set of dependencies; and
executing, by the orchestration service, a region build to build a cloud-computing region, the region build being executed based at least in part on identifying, based at least in part on the second set of dependencies, a second order of a second set of provisioning and deployment operations that, when executed, provision second infrastructure resources and deploy second artifacts for each of the plurality of services according to the second order, the second order being different from the first order.

2. The computer-implemented method of claim 1, further comprising:
maintaining, by the orchestration service, an override version set identifying at least one configuration file that is to override a corresponding configuration file of the second set of configuration files;
detecting an addition to the override version set; and
in response to detecting the addition to the override version set, executing operations for modifying the region build based at least in part on the at least one configuration file.

3. The computer-implemented method of claim 2, wherein executing the operations for modifying the region build further comprise:
generating or modifying a data structure that identifies dependencies between services of the region build based at least in part on the override version set; and
traversing the data structure, wherein traversing the data structure causes the orchestration service to instruct a provisioning and deployment manager to perform operations for provisioning or deploying a service resource according to respective configuration files associated with the override version set.

4. The computer-implemented method of claim 3, wherein the service resource comprises an infrastructure component associated with a particular service or an artifact associated with the particular service.

5. The computer-implemented method of claim 1, wherein the first set of configuration files comprises a first configuration file, wherein the first configuration file is a particular version of a plurality of versions, and wherein the first version set specifies the particular version of the plurality of versions is to be utilized.

6. The computer-implemented method of claim 1, wherein maintaining the plurality of version sets further comprises:
receiving, prior to the validation process, a new version of a particular configuration file;
adding the new version of the particular configuration file to a third version set, the third version set being associated with a default version set; and
modifying the first version set to include the new version of the particular configuration file based at least in part on a predefined schedule associated with updating, using the default version set, the first version set that is to be used to execute the validation process.

7. A cloud-computing system comprising:
one or more processors; and
one or more memories storing computer-executable instructions that, when executed by the one or more processors, cause an orchestration service of the computing system to:
 maintain a plurality of version sets identifying a respective set of configuration files of a plurality of configuration files associated with building a plurality of services, the plurality of configuration files identifying a set of infrastructure components to be provisioned and a set of artifacts to be deployed as part of building each of the plurality of services;
 determine a first version set identifying a first set of configuration files from the plurality of configuration files;
 identify a first set of dependencies between the plurality of services based at least in part on parsing the first set of configuration files identified by the first version set;
 execute a validation process for validating the first set of configuration files identified by the first version set, the validation process comprising identifying, based at least in part on the first set of dependencies, a first order of a first set of provisioning and deployment operations that, when executed, provision first infrastructure resources and deploy first artifacts for each of the plurality of services according to the first order;
 generate a second version set identifying a second set of configuration files, the second set of configuration files being identified from the first set of configuration files based at least in part on identifying configuration files that successfully passed the validation process;
 identify a second set of dependencies between the plurality of services based at least in part on parsing the second set of configuration files identified by the second version set, the second set of dependencies being different from the first set of dependencies; and
 execute a region build to build a cloud-computing region, the region build being executed based at least in part on identifying, based at least in part on the second set of dependencies, a second order of a second set of provisioning and deployment operations that, when executed, provision second infrastructure resources and deploy second artifacts for each of the plurality of services according to the second order, the second order being different from the first order.

8. The cloud-computing system of claim 7, wherein executing the instructions further causes the orchestration service to:
 maintain an override version set identifying at least one configuration file that is to override a corresponding configuration file of the second set of configuration files;
 detect an addition to the override version set; and
 in response to detecting the addition to the override version set, execute operations for modifying the region build based at least in part on the at least one configuration file.

9. The cloud-computing system of claim 8, wherein executing the operations that modify the region build further causes the orchestration service to:
 generate or modify a data structure that identifies dependencies between services of the region build based at least in part on the override version set; and
 traverse the data structure, wherein traversing the data structure causes the orchestration service to instruct a provisioning and deployment manager to perform operations for provisioning or deploying a service resource according to respective configuration files associated with the override version set.

10. The cloud-computing system of claim 9, wherein the service resource comprises an infrastructure component associated with a particular service or an artifact associated with the particular service.

11. The cloud-computing system of claim 7, wherein the first set of configuration files comprises a first configuration file, wherein the first configuration file is a particular version of a plurality of versions, and wherein the first version set specifies the particular version of the plurality of versions is to be utilized.

12. The cloud-computing system of claim 7, wherein executing the instructions to maintain the plurality of version sets further causes the orchestration service to:
 receive, prior to the validation process, a new version of a particular configuration file;
 add the new version of the particular configuration file to a third version set, the third version set being associated with a default version set; and
 modify the first version set to include the new version of the particular configuration file based at least in part on a predefined schedule associated with updating, using the default version set, the first version set that is to be used to execute the validation process.

13. A non-transitory computer-readable storage medium storing computer-executable instructions that, when executed by one or more processors of a cloud-computing system, cause an orchestration service of the cloud-computing system to:
 maintain a plurality of version sets identifying a respective set of configuration files of a plurality of configuration files associated with building a plurality of services, the plurality of configuration files identifying a set of infrastructure components to be provisioned and a set of artifacts to be deployed as part of building each of the plurality of services;
 determine a first version set identifying a first set of configuration files from the plurality of configuration files;
 identify a first set of dependencies between the plurality of services based at least in part on parsing the first set of configuration files identified by the first version set;
 execute a validation process for validating the first set of configuration files identified by the first version set, the validation process comprising identifying, based at least in part on the first set of dependencies, a first order of a first set of provisioning and deployment operations that, when executed, provision first infrastructure resources and deploy first artifacts for each of the plurality of services according to the first order;
 generate a second version set identifying a second set of configuration files, the second set of configuration files being identified from the first set of configuration files based at least in part on identifying configuration files that successfully passed the validation process;
 identify a second set of dependencies between the plurality of services based at least in part on parsing the second set of configuration files identified by the second version set, the second set of dependencies being different from the first set of dependencies; and execute a region build to build a cloud-computing region, the region build being executed based at least in part on identifying, based at least in part on the second set of dependencies, a second order of a second set of provisioning and deployment operations that, when executed, provision second infrastructure resources and deploy second artifacts for each of the plurality of services according to the second order, the second order being different from the first order.

14. The non-transitory computer-readable storage medium of claim 13, wherein executing the instructions further causes the orchestration service to:

maintain an override version set identifying at least one configuration file that is to override a corresponding configuration file of the second set of configuration files;

detect an addition to the override version set; and in response to detecting the addition to the override version set, execute operations for modifying the region build based at least in part on the at least one configuration file.

15. The non-transitory computer-readable storage medium of claim 14, wherein executing the operations for modifying the region build further causes the orchestration service to:

generate or modify a data structure that identifies dependencies between services of the region build based at least in part on the override version set; and traverse the data structure, wherein traversing the data structure causes the orchestration service to instruct a provisioning and deployment manager to perform operations for provisioning or deploying a service resource according to respective configuration files associated with the override version set.

16. The non-transitory computer-readable storage medium of claim 15, wherein the service resource comprises an infrastructure component associated with a particular service or an artifact associated with the particular service.

17. The non-transitory computer-readable storage medium of claim 13, wherein executing the instructions to maintain the plurality of version sets further causes the orchestration service to:

receive, prior to the validation process, a new version of a particular configuration file;

add the new version of the particular configuration file to a third version set, the third version set being associated with a default version set; and modify the first version set to include the new version of the particular configuration file based at least in part on a predefined schedule associated with updating, using the default version set, the first version set that is to be used to execute the validation process.

* * * * *